United States Patent [19]

Rumbaugh

[11] Patent Number: 5,347,382
[45] Date of Patent: Sep. 13, 1994

[54] LIQUID CRYSTAL CELL RETARDER WITH DRIVING BEYOND RETARDANCE VALUE AND TWO CELLS FOR HIGH SPEED

[76] Inventor: Scott H. Rumbaugh, 19419 SW. Tualamere, Lake Oswego, Oreg. 97035

[21] Appl. No.: 872,599
[22] Filed: Apr. 23, 1992
[51] Int. Cl.$^5$ .............................................. G02F 1/137
[52] U.S. Cl. ...................................... 359/84; 359/53; 359/93
[58] Field of Search .................. 359/55, 53, 84, 94; 345/89, 95

[56] References Cited

U.S. PATENT DOCUMENTS

| | | | |
|---|---|---|---|
| Re. 32,521 | 10/1987 | Fergason | 359/53 |
| 3,558,214 | 1/1971 | Lang et al. | 359/322 |
| 3,558,215 | 1/1971 | Lang et al. | 359/322 |
| 3,891,307 | 6/1975 | Tsukamoto et al. | 359/55 |
| 4,017,156 | 4/1977 | Moriyama et al. | 359/53 |
| 4,466,702 | 8/1984 | Wiener-Avnear et al. | 359/63 |
| 4,566,758 | 1/1986 | Bos | 359/91 |
| 4,595,259 | 6/1986 | Pessegaux | 359/55 |
| 4,635,051 | 1/1987 | Bos | 359/64 |
| 4,652,087 | 3/1987 | Bos et al. | 359/64 |
| 4,770,500 | 9/1988 | Kalmanash et al. | 359/64 |
| 4,830,468 | 5/1989 | Stephony et al. | 359/59 |
| 4,979,235 | 12/1990 | Rumbaugh et al. | 359/192 |
| 4,991,941 | 2/1991 | Kalmanash | 359/64 |
| 5,005,952 | 4/1991 | Clark et al. | 354/53 |
| 5,014,048 | 5/1991 | Knapp | 359/805 |
| 5,126,864 | 6/1992 | Akiyama et al. | 359/53 |
| 5,187,603 | 2/1993 | Bos | 359/63 |

FOREIGN PATENT DOCUMENTS 2196751 5/1988 United Kingdom .

OTHER PUBLICATIONS

E. Kaneko "Liquid Crystal TV Displays", 1987 KTK Scientific Publishers.
Journal of Litewave Technology vol. 8, No. 3, Mar. 1990 Newport Corp. brochure on Liquid Crystal Light Control System.
Meadowlark Optics brochure on Liquid Crystal Variable Retarders Applied Optics pp. 2235–2239 vol. 19, No. 13, Jul. 1, 1990.
J. Appl. Phys. pp. 2029–2037 vol. 43, No. 5, May 1972.
J. of Litewave Tech. vol. Lt4, No. 3, pp. 360–363, Mar. 1986.

Primary Examiner—William L. Sikes
Assistant Examiner—Kenneth Parker
Attorney, Agent, or Firm—William A. Birdwell & Associates

[57] ABSTRACT

A fast response liquid crystal optical retarder system. A liquid crystal retarder system employs one or more liquid crystal cells and corresponding drive circuits. The drive circuits provide to the cell a rectangular wave ac voltage signal whose RMS voltage is controlled. To switch from one retardance to another, the voltage is increased or decreased beyond the voltage corresponding to the target retardance and then, prior to or when the target retardance is reached, the applied voltage is switched to the voltage corresponding to the target retardance. One or more pairs of liquid crystal cells provided sequentially along the path of light propagation and with their eigen-axis orthogonal to one another to increase or decrease the total retardance rapidly. The retarder system is incorporated in a polarization control system and in a fiber-optic link.

21 Claims, 12 Drawing Sheets

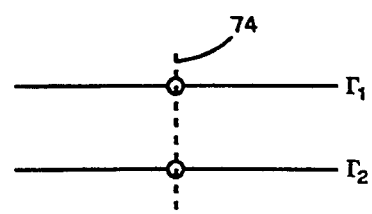
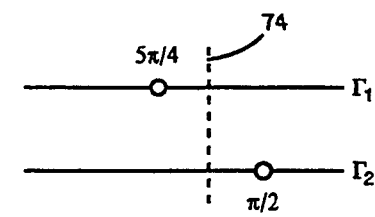
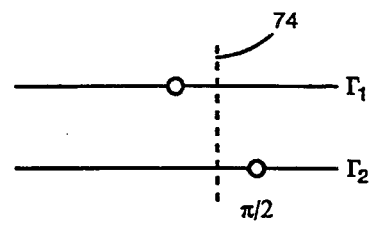
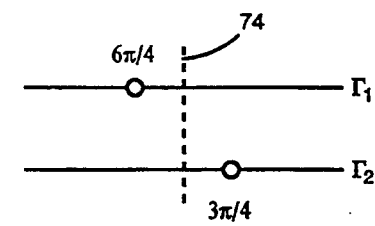
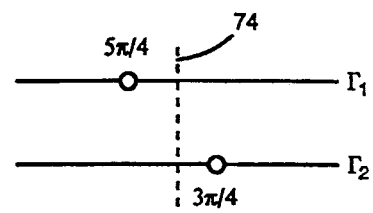
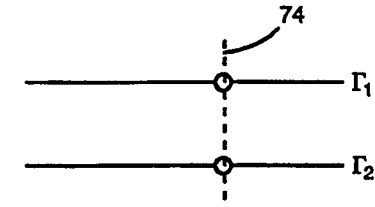
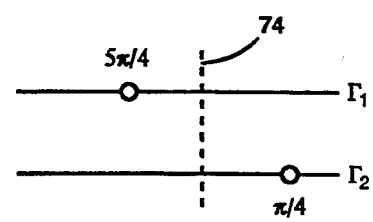
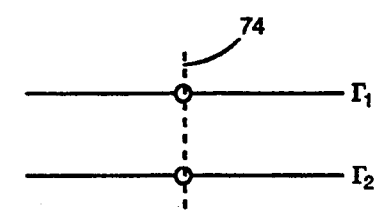
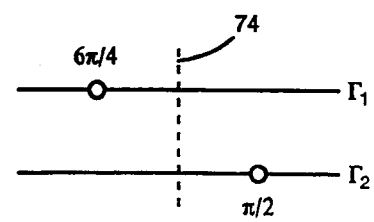

LIQUID CRYSTAL CELL RETARDER WITH DRIVING BEYOND RETARDANCE VALUE AND TWO CELLS FOR HIGH SPEED

This invention was made with Government support under Award Number ISI-9060190 awarded by the National Science Foundation. The Government has certain rights in this invention.

BACKGROUND OF THE INVENTION

This invention relates to optical retarder devices, and particularly to fast response liquid crystal cell optical retarder systems and polarization control systems.

In optical devices, instruments, communication systems and laboratory set-ups, it is often desirable to be able to selectively vary the retardance of one polarization component of a light beam relative to another, orthogonal component so as to vary the total polarization of a light beam. This has typically been accomplished using optical wave plates disposed parallel to one another wherein the polarization is varied by rotating the fast axis of one wave plate with respect to the fast axis of the other. In fiber-optic communication systems, polarization adjustability has been accomplished typically by mechanical devices that squeeze, or otherwise stress the fiber, so as to change its birefringent properties.

Polarization can also be selectively controlled by the use of a liquid crystal cell retarder. In such devices, the phase of light polarized along one axis with respect to another, orthogonal axis varies in accordance with the amplitude of an applied ac voltage. This characteristic has been employed in optical shutters, as disclosed in Box U.S. Pat. No. 4,635,051, issued Jan. 6, 1987 and entitled "High-Speed Electro-Optical Light Gate and Field Sequential Full Color Display System Incorporating Same," and in polarization control systems, as disclosed in Rumbaugh U.S. Pat. No. 4,979,235, et al. issued Dec. 18, 1990 and entitled "Polarization Controller for Use in Optical Fiber Communications System" and Clark U.S. Pat. No. 5,005,952, et al issued Apr. 9, 1991 and entitled "Polarization Controller," all of which patents are herein incorporated by reference in their entirety. However, where used to vary polarization by switching between intermediate values over a range of retardances, known liquid crystal cell retarder systems have two significant drawbacks.

First, a change in retardance in one direction must be effectuated by the application of an increased ac voltage, but the response speed of the retarder in that direction is limited by the responsiveness of the liquid crystal cell material. Second, a change of retardance in the other direction must be effectuated by reducing the applied voltage and allowing the liquid crystal material to relax back to a new retardance; that is, it cannot be driven by the application of a voltage. These two drawbacks greatly limit the response speed of a liquid crystal cell retarder and, therefore, the applications to which the retarder may be put.

In particular, the slow response time of known liquid crystal cell retarder systems limits the speed with which they can switch between intermediate values, and corresponding polarization states, over a wide range of retardances. This limits their effectiveness in producing rapid changes in light polarization in optical instruments and laboratory set-ups, and in controlling polarization and fiber-optic communication systems where significant polarization fluctuations may occur. Accordingly, there is a need for a liquid crystal cell retarder system which provides a faster response time.

SUMMARY OF THE INVENTION

The aforementioned need for a fast response liquid crystal cell retarder system has been met by the present invention through the use of a technique referred to herein as "impulse switching," and through the use of stacked, "opposing" retarders. It has been discovered that the rate at which a liquid crystal cell retarder switches from one retardance to another retardance under the influence of an electric field increases with increased applied voltage. The present invention employs this characteristic to decrease the switching time by initially applying a switching voltage higher than the voltage corresponding to the target retardance so as to cause the liquid crystal cell to move toward that target retardance at a rapid rate. Then, before, or substantially at, the time when the target retardance has been reached, the applied voltage is switched to the voltage corresponding to that target retardance, and maintained until a new retardance is desired. The term "impulse switching" used herein refers to the application of a voltage in excess of the voltage corresponding to the target retardance.

While impulse switching can be used to decrease the switching time of a liquid crystal cell retarder in one direction, the change back to the retardance in the other direction in a single cell ordinarily is accomplished by relaxation of a liquid crystal material. To decrease the switching time in the other direction, two "opposed" liquid crystal cells are used, the fast axis of each of the liquid crystal cells being disposed at $\pi/2$ radians to one another. The total retardance of both cells will therefore be the difference between the retardances produced by the two cells. Consequently, the retardance can be switched positively in one direction by application of a higher voltage to one cell and positively in the other direction by application of a higher voltage to the other cell. Impulse switching is applied to both cells to obtain the maximum switching speed in both directions.

Since liquid crystal cell retarders have retardance limits, the voltages across each of the opposed cells cannot be increased indefinitely. However, it has been discovered that the retardance relaxes in a substantially linear manner for the large part of the period of relaxation from one retardance to another. The present invention takes advantage of this feature by reducing the voltage on both cells simultaneously between switching events to zero, or some other acceptable bias voltage. This allows the cells to drift back to retardances corresponding to a lower voltage simultaneously and, since the total retardance is equal to the difference between the respective retardances, the total retardance does not change.

For situations where the time between desired changes in retardance is shorter than the time required for the two liquid crystal cell retarders to drift back to a new, adequate bias point, a second pair of opposed retarders may be stacked on the first. These can be used to switch the retardance rapidly while the first pair of the stack is drifting to a new bias point. An appropriate algorithm may be provided, under digital processor control, to maximize the speed that both pairs of opposed retarders adjust the total retardance through this retarder system. Yet additional pairs of opposed retarders may be added to the stack to decrease further the delay time between retardance switching.

The afore-described embodiments of the retarder system are incorporated in a rapid response closed loop polarization control system. They are also incorporated in a fiber-optic communications link.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIGS. 10A–10I illustrate a typical sequence of application of drive voltages to an opposed liquid crystal cell retarder system according to the present invention.

DETAILED DESCRIPTION OF THE INVENTION

Figure 1:
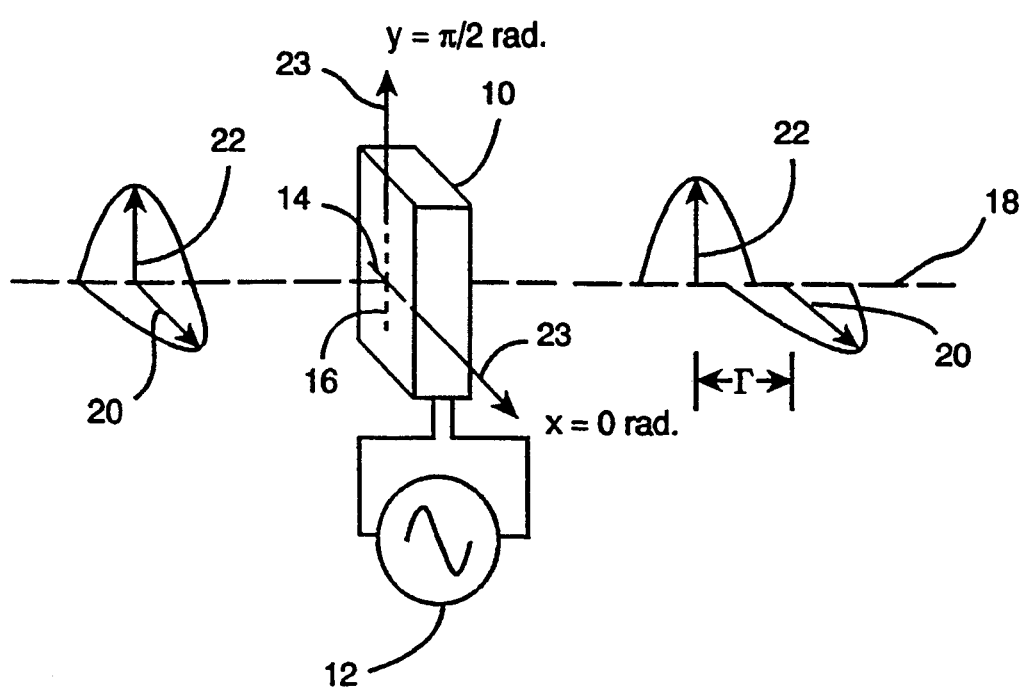
FIG. 1 is an illustration of a liquid crystal cell retarder, showing two eigen-axes, an ac drive signal source and two polarization components of a light beam before and after passing through the retarder.

As shown in FIG. 1, a typical liquid crystal optical retarder comprises a liquid crystal cell 10 and a drive signal source 12, which supplies a relatively low voltage ac drive signal. The cell 10 has two eigen-axes, that is, a fast axis 14 and a slow axis 16. Liquid crystal material is optically anisotropic and, when properly contained within a liquid crystal cell, is birefringent; that is, its index of refraction along one axis perpendicular to the axis of propagation of light through the cell is different from its index of refraction along another axis perpendicular to the axis of propagation of light through the cell. The eigen-axes of the cell are, by definition, orthogonal to one another. One axis is known as the fast axis because its index of refraction is the closest of the two indices to 1; that is, it is the axis along which light travels the fastest. Since light travels slower along the other eigen-axis it is known as the slow axis. As a practical matter, due to the anisotropic nature of liquid crystal material the indices of refraction along the two eigen-axes ordinarily are not likely ever to be equal.

The index of refraction along one of the axes of a typical liquid crystal cell of the type employed in the present invention can be varied by application of a relatively low voltage ac signal, the index of refraction being a function of the amplitude of the ac signal, as is commonly known in the art. Ordinarily, it is a non-linear function of the RMS amplitude of the ac signal. Thence, the degree of birefringence of the cell can be controlled by control of the amplitude of the ac signal applied by the drive signal source 12. Which of the two eigen-axes has an index of refraction controlled by the applied ac voltage depends on the construction of the liquid crystal cell.

As shown in FIG. 1, light propagating along axis 18, from left to right for example, can be considered as having two components of polarization, that is, a fast axis component 20 and a slow axis component 22. The amplitudes and phases of these components depend on the polarization of the propagating light relative to the axes, the electric field vector of the light representing that polarization being resolved along the two eigen-axes. In the example shown, it is assumed that the fast axis and slow axis define a cartesian coordinate system 23, the fast axis being at 0 radians and the slow axis being at $\pi/2$ radians, and that the light arriving at the cell from the left is linearly polarized with an orientation of $\pi/4$ radians with respect to the coordinate system 23. Thence, upon entering the cell 10, the fast axis polarization component 20 of the light is equal in magnitude to the slow axis component 22, and they are in phase with one another.

In the example shown in FIG. 1, when the light entering the cell 10 from the left emerges from the right, the slow axis component 22 has been delayed relative to the fast axis component 20 by some amount F, known as the retardance. This delay is caused by the birefringence of the cell, and results in a change in the polarization of the emerging light. Since the birefringence of the cell can be controlled by controlling the amplitude of the ac signal, the amount of retardance and the polarization of the emerging light likewise can be controlled by controlling the amplitude of the ac signal. In the example, the slow axis component has been delayed an amount which causes the light emerging from the cell 10 to be elliptically polarized, as is commonly understood in the art.

Figure 2:
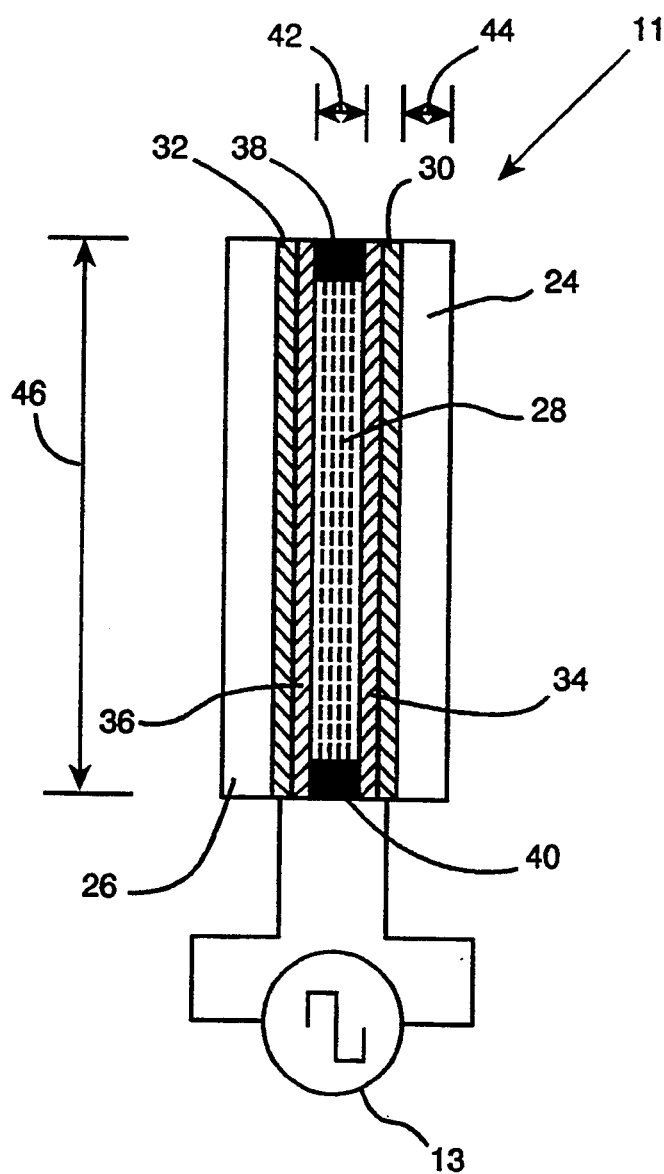
FIG. 2 is an illustration of a typical liquid crystal cell retarder showing a cross-section, including an ac drive signal source.

Turning now to FIG. 2, a liquid crystal cell 11 according to the present invention is preferably constructed of a pair of substantially-parallel transparent plates 24 and 26 made of glass (though other material could be used without departing from the principles of the invention), liquid crystal material 28 being sandwiched therebetween. While nematic liquid crystal material is preferred, twisted nematic material will work, and other liquid crystal materials may also work without departing from the principles of the invention. Transparent electrodes 30 and 32, made of indium tin oxide, for example, are disposed on the inside surfaces of the plates 24 and 26, respectively, and a drive signal source 13 is connected to those electrodes. Alignment layers 34 and 36, typically made of rubbed polyimid or sputtered silicon monoxide are disposed on the insides of the electrodes 30 and 32, respectively, to align the liquid crystal material adjacent the plates 24 and 26, as is commonly understood in the art. Preferably, spacers 38 and 40 are disposed at the edge of the cell to keep them separated a predetermined distance. The construction and operation of such a liquid crystal cell is well understood in the art.

It is to be understood that, while a liquid crystal cell of this type is preferred, other types of liquid crystal cells may be used without departing from the principles of the invention. It is also to be understood that, in practice, the cell 11 may actually only be a part of a larger element, such as an array or stack of cells in a liquid crystal display.

Preferably, the drive signal source 13 provides a rectangular waveform having a 50% duty cycle, that is, a square wave. This is because, while the breakdown voltage of the liquid crystal cell is a function of the peak voltage of the applied signal, it has been found that the rate at which liquid crystal material will change its alignment, and thereby change its birefringence, in response to an applied signal is a function of the RMS voltage of the applied signal. Since the RMS voltage of a square wave signal is higher than the RMS voltage of a sine wave signal, for a given peak voltage, a square wave signal produces a shorter response time than a sine wave. Other waveforms may be used, however, without departing from the principles of the invention.

The dimensions of the cell 11, that is, the spacing 42, the plate thickness 44 and size 46 (that is, the height and width, or diameter), may vary considerably, depending on the application. Minimum spacing will tend to minimize response time, while the range of retardance that can be adjusted with the cell becomes less with closer spacing. In addition, in most applications requiring high purity polarization, it is counterproductive to introduce any optical discontinuities, such as would be caused by spacers, so edge spacing may be important. At the same time, where edge spacing is used and a relatively large cell is needed, the plate thickness must be great enough to maintain a substantially constant spacing throughout the interior of the cell.

Figure 3:
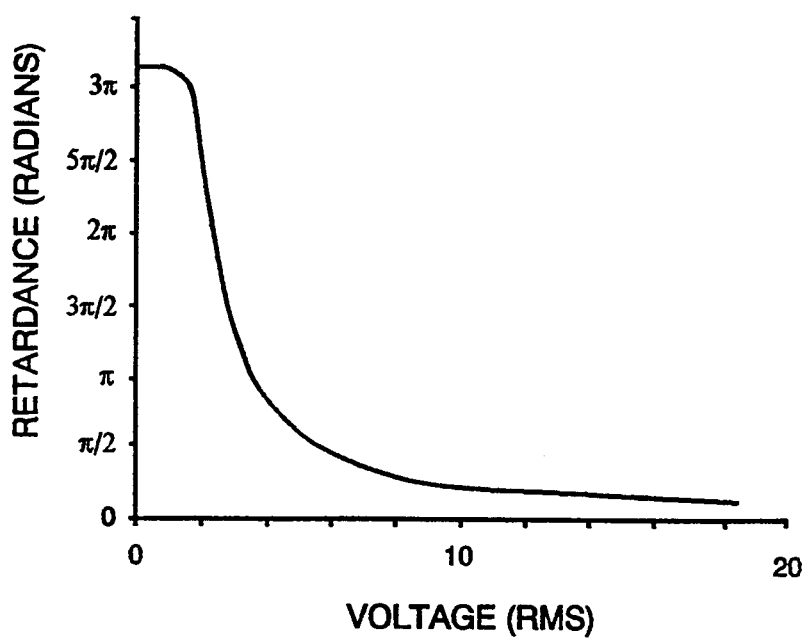
FIG. 3 is a graph of the retardance of a liquid crystal cell retarder as a function of voltage.
Figure 4:
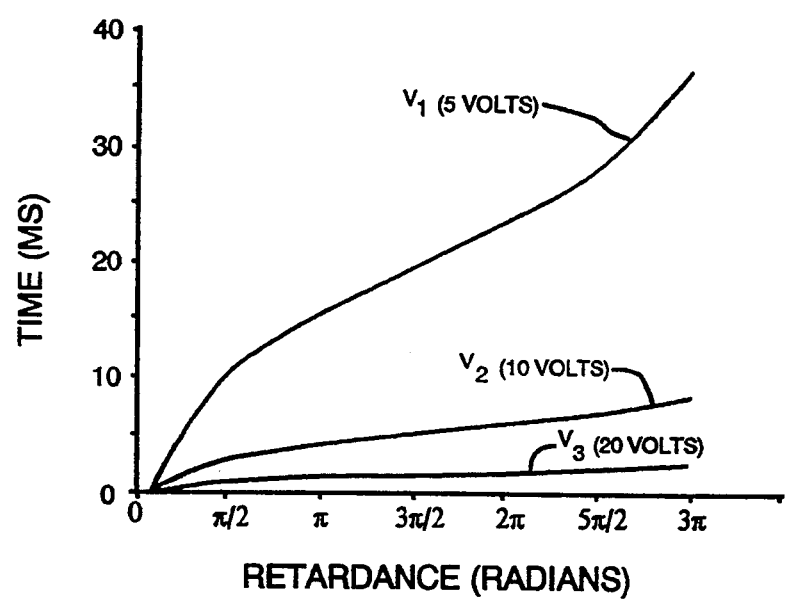
FIG. 4 is a graph of the retardance of a liquid crystal cell retarder as a function of time upon the application of a step function voltage for three different voltages.

As has been mentioned above, both the change, and rate of change, in birefringence of the cell 11 are functions of the applied RMS voltage. Thence, the retardance $\Gamma$ produced by the cell is a function of the applied RMS voltage, as shown by FIG. 3, and the rate of change of that retardance is also a function of the applied RMS voltage, as shown by FIG. 4. FIG. 4 shows a graph of the retardance of a typical cell 11 as a function of time upon the application of a step function voltage (RMS) for three different voltages. Upon the application of voltage V1 (5 volts), the retardance changes from $3.4\pi$ radians to $\pi/2$ radians in 35 milliseconds. However, upon the application of voltage V3 (20 volts), the same change in retardance takes only 2.3 milliseconds.

Figure 5:
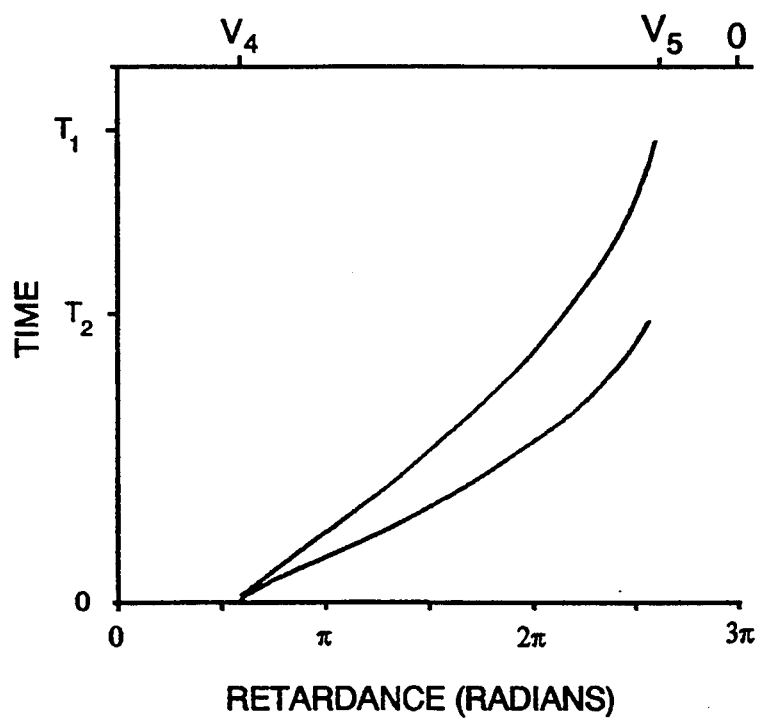
FIG. 5 is a graph of retardance of a liquid crystal cell retarder as a function of time following the step function reduction of a voltage applied to that cell for two different reductions in voltage.
Figure 6A:
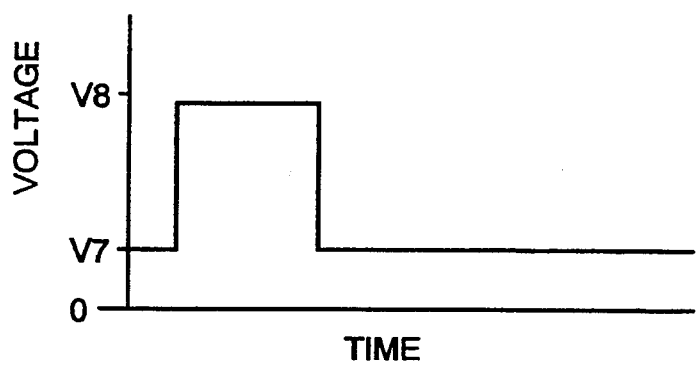
FIG. 6A shows the RMS amplitude of a rectangular waveform ac voltage pulse to be applied to a liquid crystal cell retarder.
Figure 6B:
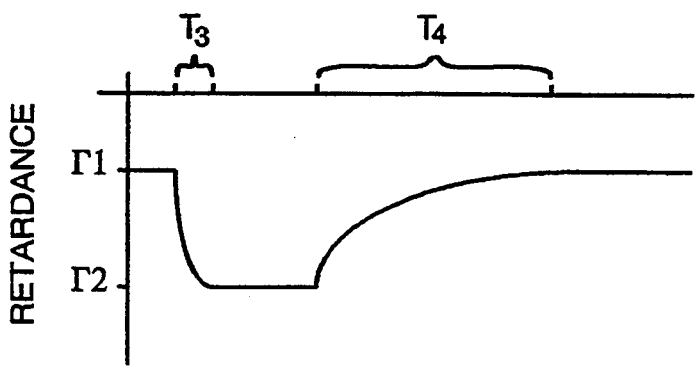
FIG. 6B shows the retardance of a liquid crystal cell retarder as a function of time in response to the ac voltage pulse of FIG. 5A.

While an increase in applied voltage drives a change in liquid crystal birefringence, a change in birefringence in the opposite direction, that is, relaxation to a lower voltage state, is not driven by the applied voltage. However, it has also been found that the rate of relaxation of liquid crystal material to a lower voltage state is affected by the applied voltage. As can be seen in FIG. 5, which shows a graph of retardance of the cell 11 following the step function reduction of the voltage applied to that cell, when changing from the retardance corresponding to voltage V4 to the retardance corresponding to voltage V5, the cell would take time T1. If the applied voltage is reduced below voltage V5 to voltage V6, the retardance curve extends further to the right so that the cell will relax faster over the same voltage range, taking only time T2, which is less than T1. Preferably, the voltage V6 would be zero. In any case, the relaxation of the cell retardance over the useful range is essentially linear with time. An impulse switching feature of the present invention is illustrated by FIGS. 6A through 6D. First, the response of a conventional liquid crystal retarder system is shown in FIGS. 6A and 6B. FIG. 6A shows the application of an ac voltage pulse (volts RMS as a function of time), and FIG. 6B shows the response of the conventional retarder to that pulse (retardance, $\Gamma$ as function of time). It can be seen that when the voltage pulse changes from voltage V7, corresponding to the initial retardance $\Gamma_1$, to voltage V8, corresponding to a target retardance $\Gamma_2$, the time for the cell to switch retardances is T3. When the pulse falls back to voltage V7, the relaxation time is T4.

Figure 6C:
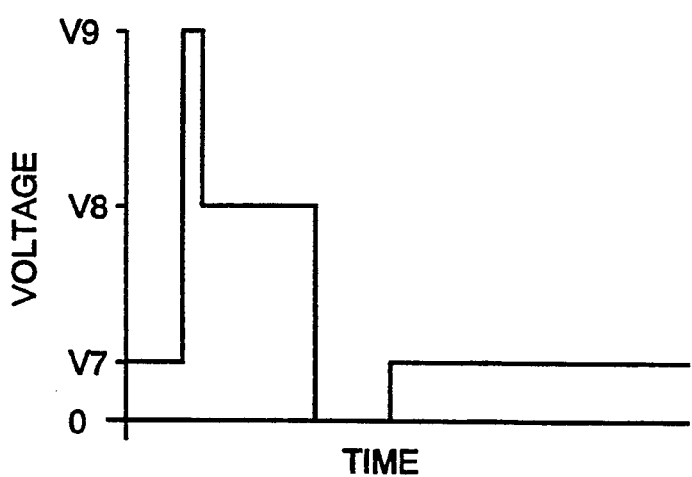
FIG. 6C shows the RMS amplitude of an ac voltage pulse applied to a liquid crystal cell retarder according to the principles of the present invention.
Figure 6D:
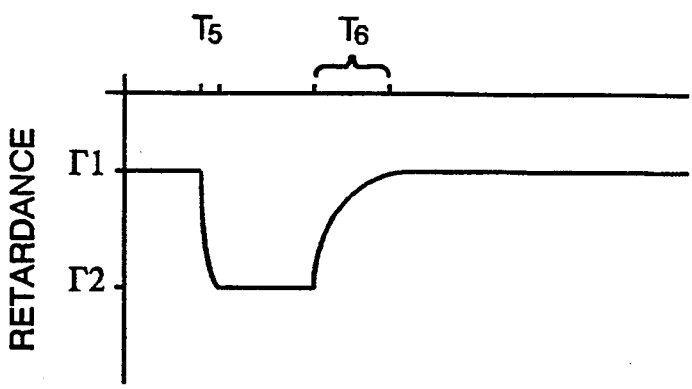
FIG. 6D shows retardance of a liquid crystal cell retarder as a function of time in response to the ac voltage pulse of FIG. 6C.

However, as shown by FIGS. 6C and 6D, according to the present invention to change the retardance from $\Gamma_1$ to $\Gamma_2$, the applied voltage is first switched to voltage V9, until the retardance reaches $\Gamma_2$, then it is switched to voltage VS. That is, the applied signal is first switched to a voltage higher than that corresponding to the target retardance long enough, or nearly long enough, for the target retardance to be reached, then switched to the voltage corresponding to the target retardance to maintain that retardance, taking into account the voltage rise and fall time limitations of the drive circuitry. As a result, the time T5 for the retardance to change from $\Gamma_1$ to $\Gamma_2$ is much less than in a conventional system. Preferably, the applied signal would be switched initially to the maximum allowable voltage so as to attain the maximum rate of change of retardance. The portion of the drive signal waveform occurring during the switching of the liquid crystal in response to a voltage increase is referred to herein as the switching impulse, and has a duration referred to herein as the switching impulse period.

Similarly, to return to retardance $\Gamma_1$, the applied signal is switched to 0 volts, until $\Gamma_1$ is reached or nearly reached, then it is switched to voltage V7. That is, the applied signal is first switched to a lower voltage (preferably 0 volts) than that corresponding to the relaxation target retardance until that retardance is reached or nearly reached, then it is switched to the voltage corresponding to that target retardance to maintain that retardance. Consequently, the relaxation time T4 is reduced significantly. The portion of the drive signal waveform occurring during the relaxation of the liquid crystal is referred to herein as the "relaxation impulse," and has a duration referred to herein as the relaxation impulse period.

It is to be recognized, of course, that in practice the retardance may be switched between many different, often random, values using the same principles of this invention.

Figure 7:
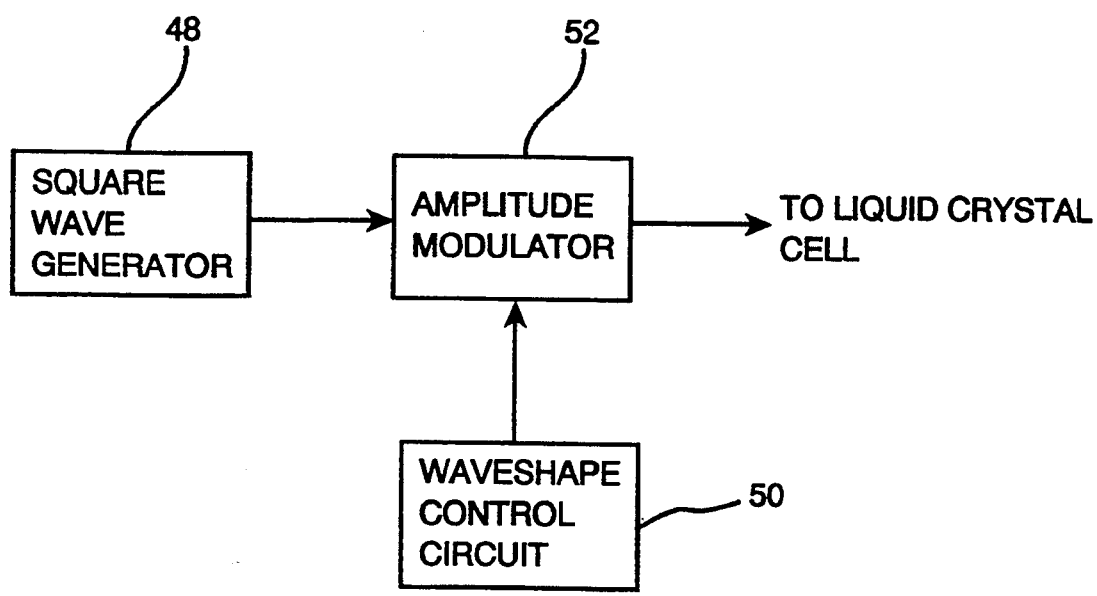
FIG. 7 shows an ac drive signal circuit for a liquid crystal retarder system according to the present invention.
Figure 8:
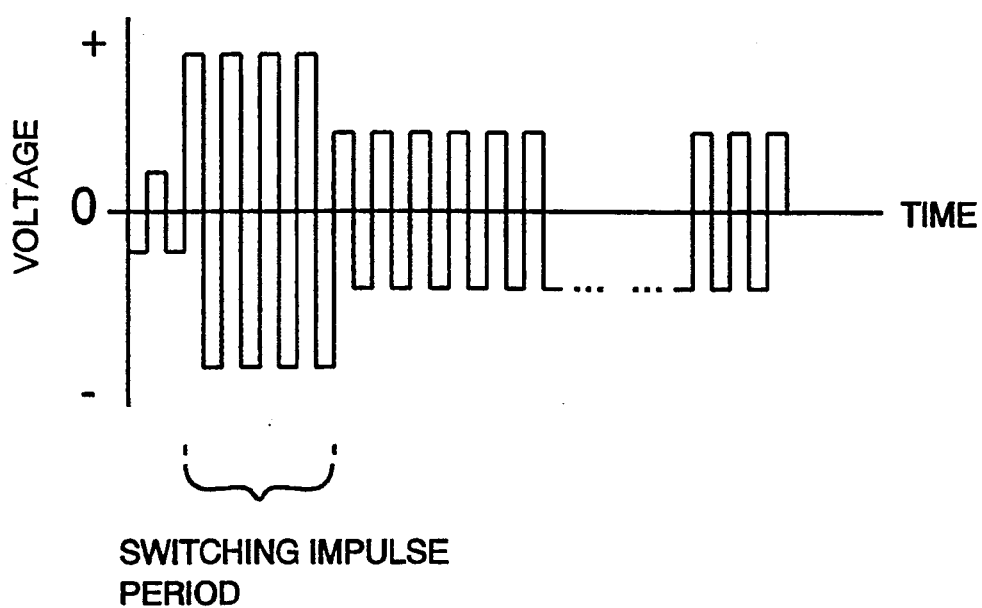
FIG. 8 shows an ac voltage drive signal generated by the drive signal circuit of FIG. 7.

A block diagram of a drive signal source 13 according to the present invention is shown by FIG. 7. It comprises an ac signal source, preferably a square wave generator 48, a waveshape control unit 50 and an amplitude modulator 52. The square wave generator produces a square wave voltage at an appropriate frequency as is commonly understood in the art. The waveshape control unit produces the switching waveshape, that is, it provides the RMS voltage applied signal waveshape. This circuit would either include data representative of the empirically or analytically determined response characteristics of the liquid crystal cell 11, so that the time to impulse switch from one retardance to another can be predicted, or it would include a feedback control circuit responsive to the change of polarization of light passing through the cell to determine when the target retardance is reached so as to switch from the impulse voltage to the voltage corresponding to that target retardance. Preferably, this would be accomplished by digital processing, though analog processing may be appropriate in some cases. Ordinarily, the waveshape control circuit would either include, or be responsive to, a circuit for determining what the target retardances should be, depending on the particular application. The amplitude modulator 52 modulates the signal produced by the square wave generator 48 to produce an ac drive signal having the envelope for the required voltage as, for example, the drive signal shown in FIG. 8.

Figure 9:
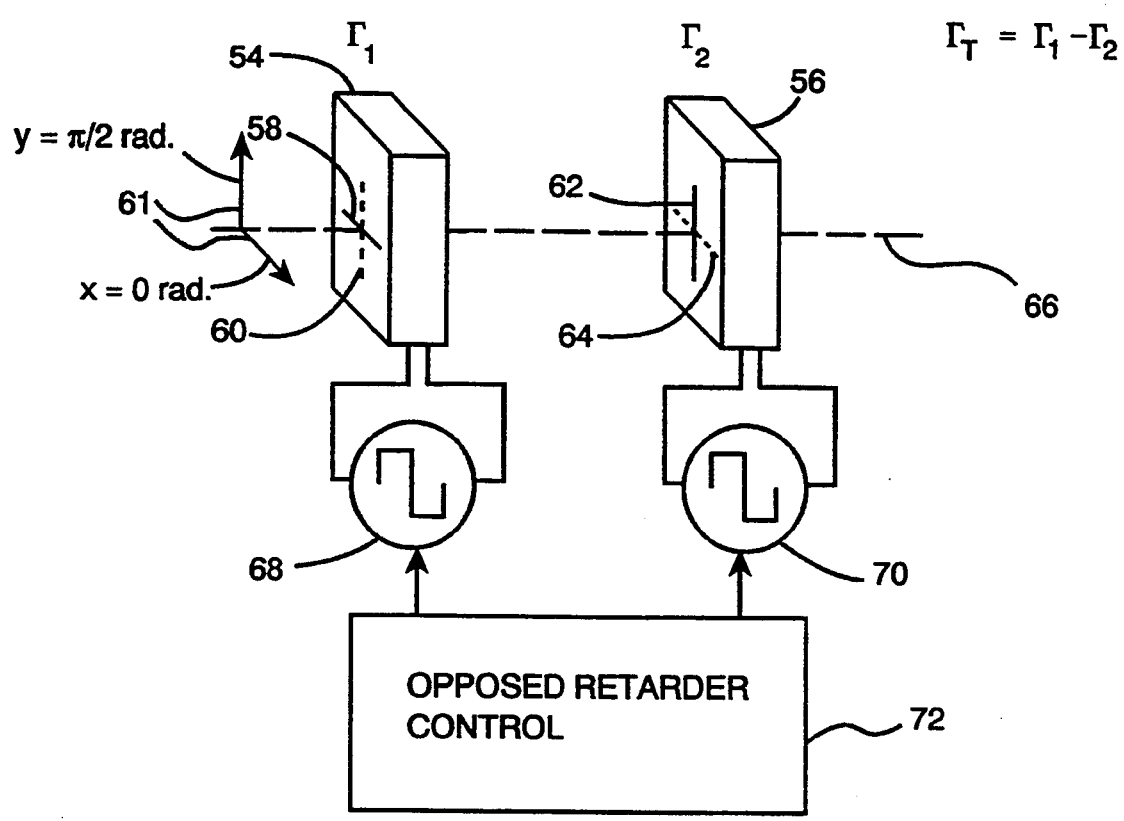
FIG. 9 shows an opposed liquid crystal cell retarder system according to the present invention.

An opposing retarder system for driving a change in retardance either from a low retardance to a high retardance or vice-versa by an increase in voltage according to the present invention is shown in FIG. 9. This embodiment comprises a first liquid crystal cell 54 and a second liquid crystal cell 56, both of which are preferably like liquid crystal cell 11. The fast axis 58 of cell 54 is aligned at 0 radians and the slow axis 60 is aligned at $\pi/2$ radians relative to coordinate system 61; however, the fast axis of cell 56 is aligned at $\pi/2$ radians while its slow axis 60 is aligned at 0 radians. Consequently, the total retardance $\Gamma_T$ produced in light propagating along propagation axis 66 passing through both cells is $\Gamma_1$ minus $\Gamma_2$, that is:

$$\Gamma_T = \Gamma_1 - \Gamma_2$$

Since $\Gamma_1$ can be decreased by increasing the drive signal applied to cell 54 and $\Gamma_2$ can be decreased by increasing the drive signal applied to cell 56, the total retardance $\Gamma_T$ can be either increased or decreased by an increase in the voltage applied to one of the two cells, thereby taking advantage of the faster rate of retardance switching as compared to retardance relaxation. Moreover, by employing the impulse switching feature of the present invention along with this opposing retarder feature, the total retardance can be changed even faster.

In addition to the first cell 54 and the second cell 56, the opposing retarder system shown in FIG. 9 includes a first drive signal generator 68 and a second drive signal generator 70, respectively, for applying drive signals to the cells, as described with respect to liquid crystal cell 11. It also includes an opposed retarder control circuit 72, which is connected to each of the first and second drive signal generators to provide them with control signals which govern their drive signal wave shapes. Thence, for example, assuming that the retardance of a given liquid crystal cell decreases with increasing drive voltage and vice-versa, to decrease total retardance the opposing retarder control 72 will cause the first drive signal generator 68 to increase the drive signal voltage to the first cell 54; to increase the total retardance, the control circuit 72 will cause the second drive signal generator 70 to increase the drive signal voltage to the second cell 56. Since this cannot go on indefinitely, the cells having maximum, breakdown voltages, the drive signal voltages must periodically be reduced simultaneously to allow the retardances to relax back to lower voltage states, as explained hereafter.

The operation of the opposing retarder system according to the present invention is explained more specifically, and by way of example, with respect to FIGS. 10A through 10I. In order for a given cell to increase or decrease the retardance from its quiescent state, the cells are ordinarily biased by a bias voltage $V_{bias}$, corresponding to a predetermined retardance at the middle of the retardance adjustment range. Assuming that the cells have a retardance range of $2\pi$ radians, they would typically be biased at $\pi$ radians of retardance, as shown in FIG. 10A. Ideally, the midpoint 74 between the retardances of the two cells would be kept at the bias point to provide maximum adjustability in either direction at any given moment. That cannot be done, because the retardances of the cells cannot be relaxed back to their starting retardances instantaneously. However, they can be allowed to relax back simultaneously without changing the total retardance significantly, because, as has been pointed out above, the relaxation of retardance is essentially linear with time.

Accordingly, to change the total retardance from 0 radians, as in FIG. 10A to $\pi/2$ radians as in FIG. 10B the voltage applied to second cell 56 is increased. Then, the voltage applied to both cells is simultaneously reduced so that both cells will relax back by $\pi/4$ radians of retardance, thereby moving the midpoint 74 back to the bias value, as shown in FIG. 10C. To increase the total retardance $\pi/2$ radians further, the voltage applied to the second cell is increased again, as shown in FIG. 10D. Then, to return the midpoint to the bias value, the voltage applied to both cells is reduced an amount corresponding to an increase of $\pi/4$ radians of retardance. To reduce the total retardance by $\pi/4$ radians the voltage applied to the first cell is increased, as shown in FIG. 10F. Then, to return to the bias value, the voltages applied to both cells are reduced, as shown in FIG. 10G. To return to 0 total retardance, the voltage applied to the first cell is increased again, as in FIG. 10H, and the voltages applied to both cells are then simultaneously reduced to return the midpoint 74 to the bias value (the midpoint in this case being equal to the bias value).

Thence, it can be seen that, by increasing one or the other of the drive voltages and thereafter reducing them simultaneously, the total retardance can be switched rapidly in either direction indefinitely, provided that sufficient time is allowed between total retardance switching for the cells to drift back far enough for the next change in total retardance. Preferably, the impulse switching feature of this invention will be used to reduce these times even further.

Figure 11:
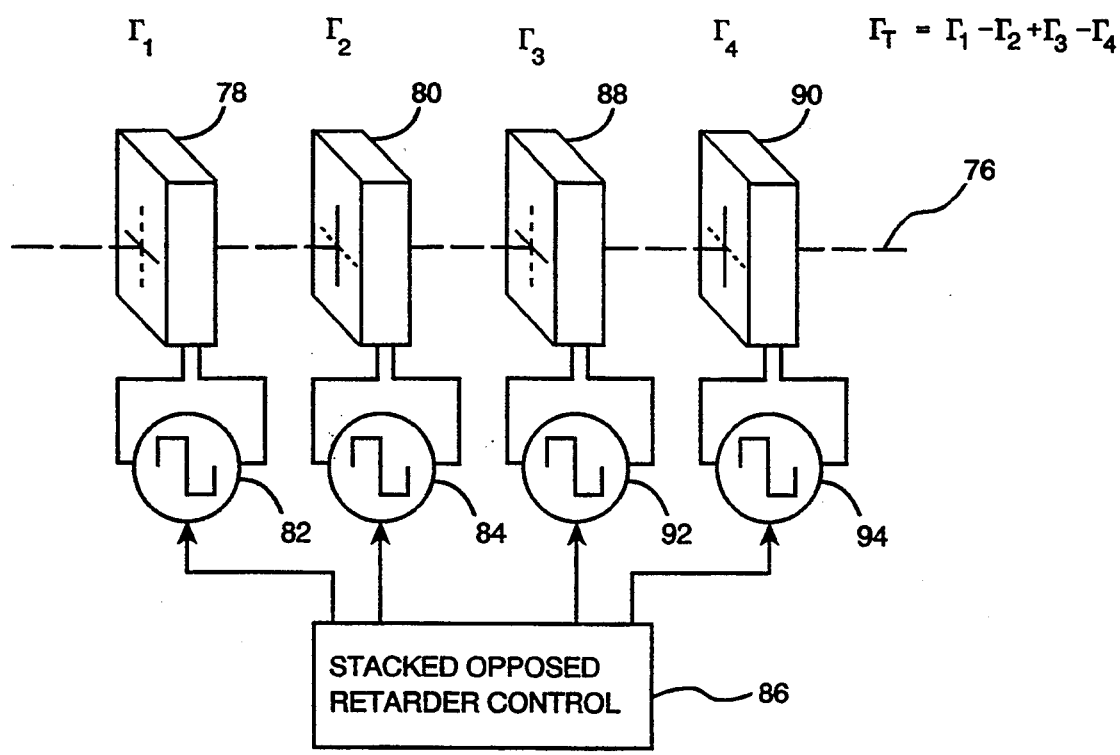
FIG. 11 shows a stacked, opposed liquid crystal cell retarder system according to the present invention.

Notwithstanding that relaxation time for a liquid crystal cell can be reduced by the techniques of the present invention, the relaxation time is much longer than the switching time for voltage increases. This means that there will be occasions when a single pair of opposed cells cannot be switched from a first retardance to a second as quickly as other times because the new retardance is beyond the switching limit, given the current position of the midpoint, so that there will be a delay until the midpoint has relaxed far enough. To reduce this delay, one or more additional pairs of opposed liquid cells may be stacked along an axis of propagation 76, as shown in FIG. 11. Thence, a first pair of opposed cells 78 and 80 are provided with respective drive signal circuits 82 and 84, which are controlled by a stacked opposed retarder control circuit 86, and additional such pairs up to N pairs, represented by cells 88 and 90 and respective drive circuits 92 and 94, are also controlled by the control circuit 86. The total retardance $\Gamma_T$ is then the sum of the retardances for all of the pairs; that is, in the example shown:

$$\Gamma_T = \Gamma_1 - \Gamma_2 + \Gamma_3 - \Gamma_4.$$

When the retardance adjustment limit for one pair is not great enough for a needed adjustment and the time for that pair to relax to a midpoint that would increase that limit adequately, another pair can be used to switch the retardance, thereby reducing the delay interval by one half. To reduce that delay even further, additional cell pairs may be used, the delay time being reduced by a factor of 1/N, where N is the number of cell pairs.

The principles of the present invention may be employed in a closed loop state of polarization system, particularly one for fiber-optic communications. A system of this type which employs three liquid crystal retarders and a closed loop control system for endless polarization control is described in the aforementioned Rumbaugh U.S. Pat. No. 4,979,235 et al. The retarders of that system would be replaced with retarders according to the principles of the present invention.

Figure 12:
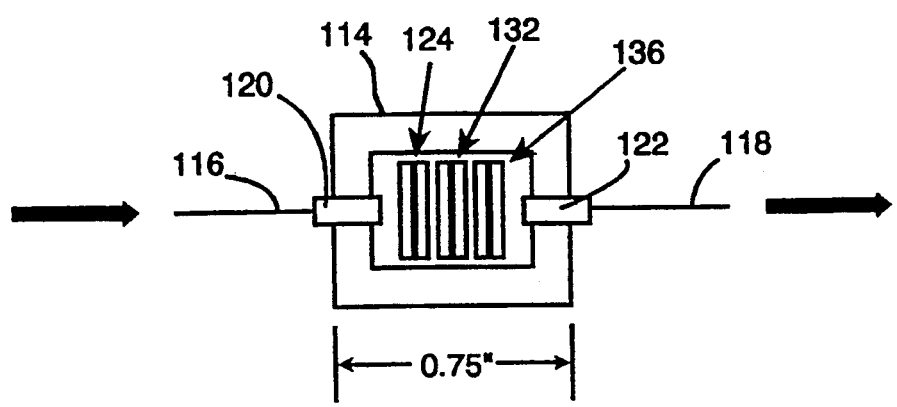
FIG. 12 shows a liquid crystal cell retarder integrated into a fiber-optic link according to the present invention.

In addition, retarders according to the principles of the present invention may be integrated into a fiber-optic link, as shown in FIG. 12. In this embodiment of the invention one or more liquid crystal retarder cells are disposed in a package 114 which is pigtailed to an input fiber 116 and to an output fiber 118. The input fiber 116 is coupled to an input graded index ("GRIN") lens 120, and the output fiber 118 is coupled to an output GRIN lens 122. The retarders are disposed between the input and output lenses. For example, the link would include a first cell 124, a second cell 132, and a third cell 136. Light from the input fiber 116 is coupled by the input lens 120 to the first cell 124, and light from the third cell 136 is coupled through the output lens 122 to the output fiber 118. Each of the cells is controlled by drive signal circuitry according to the principles of the present invention.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

I claim:

1. An optical retarder system, comprising:
   (a) first retarder means for controlling the retardance of light passing therethrough along a first eigen-axis thereof relative to a second eigen-axis thereof in response to the application of a first signal thereto; and
   (b) first drive means, connected to said first retarder means, for supplying said first signal to said first retarder means, said drive means including first control means for changing said retardance from a first retardance to a second retardance by causing said first signal to change, in a direction to move toward said second retardance, from a first amplitude which is required for said first retardance to a second amplitude, beyond a third amplitude which is required for said second retardance, for a period of time, and then causing said first signal to change to the said second amplitude required for a second retardance.

2. The optical retarder system of claim 1, wherein said first drive means includes means for increasing for a period of time the amplitude of said signal from said first amplitude to said second amplitude, then setting said amplitude of said signal to said third amplitude.

3. The optical retarder system of claim 2, wherein said first retarder means comprises a liquid crystal cell having two transparent plates disposed substantially parallel to one another, the surfaces of said plates facing one another and each having respective transparent electrodes disposed thereon, liquid crystal material disposed between said electrodes, and means for aligning said liquid crystal material in a predetermined manner.

4. The optical retarder system of claim 3, wherein said first drive means comprises means for applying to said transparent electrodes as said first signal an ac voltage of selected amplitude, and said control means comprises means for controlling said amplitude.

5. The optical retarder system of claim 1, wherein said first drive means comprises means for applying to said first retarder means as said first signal an ac voltage of selected amplitude, and said drive means comprises means for selecting said amplitude.

6. The optical retarder system of claim 4, wherein said ac voltage has a rectangular waveform of predetermined duty cycle.

7. The optical retarder system of claim 1, further comprising:
   (c) second retarder means for controlling the retardance of light passing therethrough along a first eigen-axis thereof relative to a second eigen-axis thereof by the application of a second signal to said second retarder means, said second retarder means being disposed relative to said first retarder means so that said light can pass through said first retarder means, and said second retarder means sequentially, said first eigen-axis of said second retarder means being substantially co-planer with said second eigen-axis of said first retarder means, and said second eigen-axis of said second retarder means substantially co-planer with said first eigen-axis of said first retarder means; and
   (d) second drive means for providing to said second retarder means said second signal for application to said second retarder means, said second drive means including second control means for changing said retardance from a third retardance to a fourth retardance by causing said second signal to change, in a direction to move toward said fourth retardance, from a fourth amplitude which is required for said third retardance to a fifth amplitude, beyond a sixth amplitude which is required for said fourth retardance, for a pre-determined period of time, and then causing said second signal to change to said sixth amplitude.

8. The optical retarder system of claim 7, further comprising retardance difference control means, connected to said first control means and to said second control means, for causing the total retardance of light passing through both said first retarder means and said second retarder means to be increased by changing the amplitude of the signal applied to one said retarder means and to be decreased by changing the amplitude of the signal applied to the other said retarder means.

9. The optical retarder system of claim 7, further including means for reducing the amplitude of said first signal and the amplitude of said second signal substantially the same amount so that the difference in retardance between said first retarder means and said second retarder means remains substantially constant.

10. The optical retarder system of claim 1, wherein said first drive means includes means for reducing, for a period of time, said amplitude of said signal below that amount needed to change the retardance of said retarder means to a new, selected value, then setting said amplitude to that corresponding to said new, selected value.

11. The optical retarder system of claim 10, wherein said first retarder means comprises a liquid crystal cell having two transparent plates disposed substantially parallel to one another, the surfaces of said plates facing one another and having respective transparent electrodes disposed thereon, liquid crystal material disposed between said plates, and means for aligning said liquid crystal material in a predetermined manner; and said drive means comprises means for applying to said transparent electrodes as said first signal an ac voltage of selected amplitude, and control means for controlling said amplitude.

12. The optical retarder system of claim 1, further comprising:
 (c) an input optical fiber;
 (d) first coupling means for optically coupling light emerging from said input optical fiber to said first retarder means;
 (e) an output optical fiber; and
 (f) second coupling means for optically coupling light emerging from said first retarder means into said output optical fiber.

13. The optical retarder system of claim 12, wherein either said first coupling means or said second coupling means includes a graded index lens.

14. An optical retarder system, comprising:
 (a) first retarder means, including liquid crystal material and having a fast axis and a slow axis, for controlling the retardance of light passing therethrough along said fast axis thereof relative to said slow axis thereof by the application of an electric field to said liquid crystal material, said first retarder means having a minimum retardance and a maximum retardance;
 (b) first drive means for supplying to said first retarder means a first drive signal for producing said electric field;
 (c) second retarder means, including liquid crystal material and having a fast axis and a slow axis, for controlling the retardance of light passing therethrough said fast axis thereof relative to said slow axis thereof by applying a second electric field to liquid crystal material of said second retarder means, said second retarder means being disposed relative to said first retarder means so that said light passes through said first retarder means and said second retarder means sequentially, said fast axis of said second retarder means being substantially co-planer with said slow axis of said first retarder means, and slow axis of said second retarder means being substantially co-planer with said fast axis of said first retarder means, said second retarder means having a minimum retardance and a maximum retardance;
 (d) second drive means for supplying to said second retarder means a second drive signal for producing said second electric field; and
 (e) difference control means, connected to said first drive means and to said second drive means, for adjusting the retardance of said first retarder means and the retardance of said second retarder means to respective intermediate values between said respective minimum and maximum retardances thereof so that the difference in retardance between the two is a predetermined amount.

15. The optical retarder system of claim 14, further comprising one or more additional pairs of first and second retarder means, corresponding first and second drive means and corresponding retardance difference control means, stacked relative to one another so that light can pass through each such retarder means sequentially, and stack control means, coupled to said difference control means, for selecting which of said pairs of retarder means changes the retardance of light passing through said stacked retarder means.

16. The optical retarder system of claim 15, wherein each said drive means includes means for changing the retardance of said retarder portion from a first retardance to a second retardance by causing the amplitude of said drive signal to change, in a direction to move toward said second retardance, from that amplitude which is required for said first retardance to an amplitude beyond that amplitude which is required for said second retardance for a predetermined period of time, and then causing said drive signal to change to the amplitude required for said second retardance.

17. The retarder system of claim 15, wherein each said drive means includes means for reducing the amplitude of said drive signal for one retarder means and the amplitude of the drive signal of the other retarder means of a pair of retarder means substantially the same amount so that the difference in retardance between both said retarder means remains constant.

18. An optical polarization control system, comprising:
 (a) a coherent optical input signal source;
 (b) a coherent optical reference signal source;
 (c) detector means for receiving light from said input signal source and from said reference signal source and producing an output signal representative of the intensity of light illuminating said detector;
 (d) optical retarder system, disposed between said input signal source or said reference signal source and said detector means, for controlling the retardance of light passing therethrough, said optical retarder system having:
  (i) retarder means for controlling the retardance of light passing therethrough along a first eigen-axis thereof relative to a second eigen-axis therefore in response to the application of a signal thereof; and
  (ii) drive means, connected to said retarder means, for supplying said electric signal to said retarder means, said drive means including control means for changing said retardance from a first retardance to a second retardance by causing said signal to change, in a direction to move toward said second retardance, from a first amplitude which is required for said first retardance to a second amplitude, beyond a third amplitude which is required for said first second retardance for a period of time, and then causing said signal to change to said third amplitude; and (e) control means, responsive to said output signal and connected to said drive means, for maintaining a predetermined polarization relationship between said input signal and said reference signal.

19. An optical polarization control system, comprising:
(a) a coherent optical input signal source;
(b) a coherent optical reference signal source;
(c) detector means for receiving light from said input signal source and from said reference signal source and producing an output signal representative of the intensity of the light illuminating said detector;
(d) an optical retarder system, disposed between said input signal source or said reference signal source and said detector means, for controlling the retardance of light passing therethrough, said optical retarder system having:
   (i) first retarder means, for controlling the retardance of light passing therethrough along a fast axis thereof relative to a slow axis thereof by the application of a first signal thereto;
   (ii) first drive means for supplying to said first retarder means said first signal;
   (iii) second retarder means for controlling the retardance of light passing therethrough along a fast axis thereof relative to a slow axis thereof by applying a second electric field to liquid crystal material of said second retarder means, said second retarder means being disposed relative to said first retarder means so that said light passes through said first retarder means and said second retarder means sequentially, said fast axis of said second retarder means being substantially co-planer with said slow axis of said first retarder means, and said slow axis of said second retarder means being substantially co-planer with said fast axis of said first retarder means;
   (iv) second drive means for supplying to said second retarder means a second signal for producing said second signal; and
   (v) difference control means, connected to said first drive means and to said second drive means, for adjusting the retardance of said first retarder means and the retardance of said second retarder means so that the difference between the two is a predetermined amount; and (e) control means, responsive to said output signal and connected to said drive means, for maintaining a predetermined polarization relationship between said input signal and said reference signal.

20. A method for controlling an optical retarder for controlling the retardance of light passing therethrough along a first eigen-axis thereof relative to a second eigen-axis thereof in response to the application of signal thereto, said method comprising:
(a) supplying a signal to said retarder to control its retardance;
(b) changing said retardance from a first retardance to a second retardance by causing said signal to change, in a direction to move toward said second retardance, from a first amplitude which is required for said first retardance to a second amplitude, beyond a third which is required for said second retardance, for a period of time; and
(c) thereafter causing said signal to change to said third amplitude required for said second retardance.

21. A method for controlling an optical retarder system having first and second retarders employing liquid crystal material for controlling the retardance of light passing therethrough along a fast axis thereof relative to a slow axis thereof by the application of an electric field to said liquid crystal material, said second retarder being disposed relative to said first retarder so that said light passes through said first retarder and said second retarder sequentially, said fast axis of said second retarder being substantially co-planer with said second, slow axis of said first retarder, and said slow axis of said second retarder being substantially co-planer with said fast axis of said first retarder means, said retarders each having minimum and maximum retardance values, said method comprising:
(a) applying a first electric field to the liquid crystal material of said first retarder;
(b) applying a second electric field to the liquid crystal material of said second retarder;
(c) adjusting the retardance of said first retarder and the retardance of aid second retarder to respective intermediate values between said respective minimum and maximum retardances thereof so that the difference in retardance between the two is a predetermined amount, by adjusting the amplitudes of said first electric field and said second electric field respective predetermined amounts.

* * * * *

UNITED STATES PATENT AND TRADEMARK OFFICE
CERTIFICATE OF CORRECTION

PATENT NO.   : 5,347,382
DATED        : September 13, 1994
INVENTOR(S)  : Scott H. Rumbaugh It is certified that error appears in the above-identified patent and that said Letters Patent is hereby corrected as shown below:

Column 4,
Line 46, change "F" to -- $\Gamma$ --.

Column 6,
Line 31, change "VS" to -- V8 --.

Column 7,
Line 24, change "required voltage" to -- required RMS voltage --.

Column 9,
Lines 8-9, there should be no carriage return between "and 90" and "and respective".

Column 10,
Line 6, change "the said second amplitude required for a second" to -- said third amplitude required for said second --;
Line 47, change "second retarder means" to -- second retarder means being --.

Column 11,
Lines 57-58, change "therethrough said" to -- therethrough along said --.

Column 12,
Line 51, change "optical retarder system," to -- an optical retarder system, --;
Line 58, change "second eigen-axis therefore in" to -- second eigen-axis thereof in --.

Column 13,
Line 2, change "required for said first second" to -- required, for said second --.

UNITED STATES PATENT AND TRADEMARK OFFICE
CERTIFICATE OF CORRECTION

PATENT NO. : 5,347,382
DATED : September 13, 1994
INVENTOR(S) : Scott H. Rumbaugh It is certified that error appears in the above-identified patent and that said Letters Patent is hereby corrected as shown below:

Column 14,
Line 42, change "second retarder;" to -- second retarder; and --;
Line 43, change "of aid" to -- of said --.

Signed and Sealed this

Sixteenth Day of November, 2004

JON W. DUDAS
*Director of the United States Patent and Trademark Office*

(12) EX PARTE REEXAMINATION CERTIFICATE (8100th)
United States Patent
Rumbaugh

(10) Number: US 5,347,382 C1
(45) Certificate Issued: Mar. 22, 2011

(54) LIQUID CRYSTAL CELL RETARDER WITH DRIVING BEYOND RETARDANCE VALUE AND TWO CELL FOR HIGH SPEED

(75) Inventor: Sccott H. Rumbaugh, Lake Oswego, OR (US)

(73) Assignee: Apeldyn Corporation, Portland, OR (US)

Reexamination Request:
No. 90/009,339, Nov. 20, 2008

Reexamination Certificate for:
Patent No.: 5,347,382
Issued: Sep. 13, 1994
Appl. No.: 07/872,599
Filed: Apr. 23, 1992

(51) Int. Cl.
*G02F 1/137* (2006.01)

(52) U.S. Cl. .............................. 359/84; 359/53; 359/93
(58) Field of Classification Search .................. None
See application file for complete search history.

(56) References Cited

U.S. PATENT DOCUMENTS

| | | |
|---|---|---|
| 3,503,673 A | 3/1970 | Heilmeier et al. |
| 3,558,214 A | 1/1971 | Lang et al. |
| 3,558,215 A | 1/1971 | Lang et al. |
| 3,559,190 A | 1/1971 | Bitzer et al. |
| 3,575,491 A | 4/1971 | Heilmeier |
| 3,594,761 A | 7/1971 | Boesen et al. |
| 3,630,595 A | 12/1971 | Peek |
| 3,647,958 A | 3/1972 | Sobel |
| 3,655,269 A | 4/1972 | Heilmeier |
| 3,670,263 A | 6/1972 | Kantorski et al. |
| 3,694,053 A | 9/1972 | Kahn |
| 3,696,396 A | 10/1972 | Ceschini |
| 3,700,306 A | 10/1972 | Cartmell et al. |
| 3,703,331 A | 11/1972 | Goldmacher et al. |
| 3,719,414 A | 3/1973 | Wentz |
| 3,746,422 A | 7/1973 | Chavany |
| 3,756,694 A | 9/1973 | Soree et al. |
| 3,758,973 A | 9/1973 | Miller |
| 3,776,615 A | 12/1973 | Tsukamoto et al. |
| 3,787,111 A | 1/1974 | Giordmaine et al. |

(Continued)

FOREIGN PATENT DOCUMENTS

| | | |
|---|---|---|
| DE | 2 355 752 | 6/1974 |
| DE | 28 56 134 | 6/1979 |
| DE | 29 10 571 | 9/1980 |
| DE | 35 35 391 | 4/1986 |
| DE | 38 25 697 | 2/1989 |
| DE | 39 21 837 | 2/1990 |
| DE | 198 19 460 | 11/1998 |
| DE | 101 07 544 | 9/2001 |
| DE | 101 11 139 | 10/2001 |
| DE | 101 11 142 | 10/2001 |

(Continued)

OTHER PUBLICATIONS

Yariv et al., Selected portions from a treatise entitled "Optical Waves in Crystals Propagation and Control of Laser Readiation", John Wiley & Sons, Inc., 1984.

(Continued)

*Primary Examiner*—Tuan H Nguyen

(57) ABSTRACT

A fast response liquid crystal optical retarder system. A liquid crystal retarder system employs one or more liquid crystal cells and corresponding drive circuits. The drive circuits provide to the cell a rectangular wave ac voltage signal whose RMS voltage is controlled. To switch from one retardance to another, the voltage is increased or decreased beyond the voltage corresponding to the target retardance and then, prior to or when the target retardance is reached, the applied voltage is switched to the voltage corresponding to the target retardance. One or more pairs of liquid crystal cells provided sequentially along the path of light propagation and with their eigen-axis orthogonal to one another to increase or decrease the total retardance rapidly. The retarder system is incorporated in a polarization control system and in a fiber-optic link.

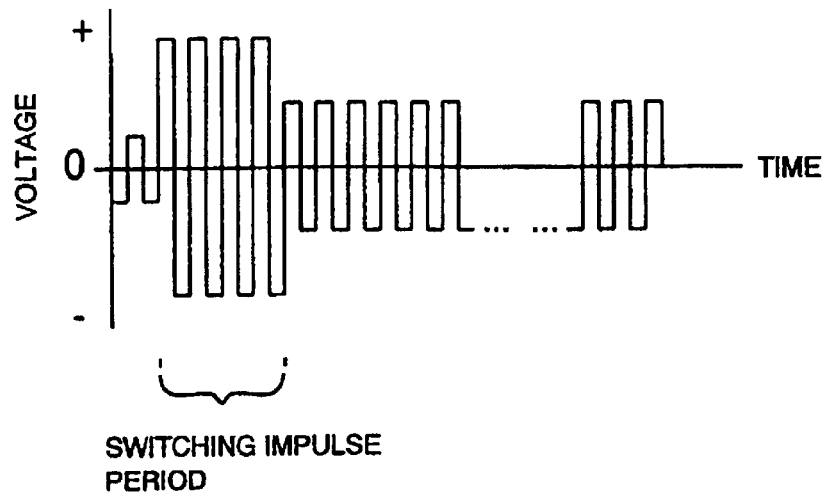

U.S. PATENT DOCUMENTS

| | | |
|---|---|---|
| 3,803,408 A | 4/1974 | Assouline et al. |
| 3,821,765 A | 6/1974 | Wagner et al. |
| 3,835,465 A | 9/1974 | Tannas, Jr. et al. |
| 3,848,965 A | 11/1974 | Adams, Jr. et al. |
| 3,851,192 A | 11/1974 | Flippen et al. |
| 3,854,751 A | 12/1974 | Haas et al. |
| 3,857,629 A | 12/1974 | Freiser |
| 3,863,023 A | 1/1975 | Schmersal et al. |
| 3,864,022 A | 2/1975 | Moriyama et al. |
| 3,868,674 A | 2/1975 | Lorteije |
| 3,876,287 A | 4/1975 | Sprokel |
| 3,888,566 A | 6/1975 | Toriyama et al. |
| 3,891,307 A | 6/1975 | Tsukamoto et al. |
| 3,895,372 A | 7/1975 | Kaji et al. |
| 3,900,246 A | 8/1975 | Kimura et al. |
| 3,902,169 A | 8/1975 | Washizuka |
| 3,910,680 A | 10/1975 | Kakeda |
| 3,914,022 A | 10/1975 | Kashnow |
| 3,918,794 A | 11/1975 | Milton |
| 3,918,796 A | 11/1975 | Fergason |
| 3,922,668 A | 11/1975 | Kishimoto et al. |
| 3,936,815 A | 2/1976 | Kogure et al. |
| 3,937,878 A | 2/1976 | Judice |
| 3,941,455 A | 3/1976 | O'Brien |
| 3,955,190 A | 5/1976 | Teraishi |
| 3,958,151 A | 5/1976 | Yano et al. |
| 3,960,438 A | 6/1976 | Bonne et al. |
| 3,973,252 A | 8/1976 | Mitomo et al. |
| 3,975,661 A | 8/1976 | Kanatani et al. |
| 3,988,616 A | 10/1976 | Shimada |
| 3,999,180 A | 12/1976 | Hickman |
| 4,006,298 A | 2/1977 | Fowler et al. |
| 4,009,934 A | 3/1977 | Goodwin et al. |
| 4,017,156 A | 4/1977 | Moriyama et al. |
| 4,017,848 A | 4/1977 | Tannas, Jr. |
| 4,024,529 A | 5/1977 | Sakai |
| 4,036,553 A | 7/1977 | Borel et al. |
| 4,042,293 A | 8/1977 | Hanak et al. |
| 4,043,640 A | 8/1977 | Berreman |
| 4,044,346 A | 8/1977 | Akahane et al. |
| 4,054,362 A | 10/1977 | Baues |
| 4,063,234 A | 12/1977 | Arn et al. |
| 4,066,333 A | 1/1978 | Dargent et al. |
| 4,079,369 A | 3/1978 | Fukumoto |
| 4,091,375 A | 5/1978 | Robillard |
| 4,106,009 A | 8/1978 | Dick |
| 4,106,858 A | 8/1978 | Dargent et al. |
| 4,120,567 A | 10/1978 | Goodman et al. |
| 4,126,382 A | 11/1978 | Barzilai et al. |
| 4,142,181 A | 2/1979 | Moricca et al. |
| 4,158,860 A | 6/1979 | Irie et al. |
| 4,161,653 A | 7/1979 | Bedini et al. |
| 4,167,024 A | 9/1979 | Hamisch |
| 4,183,062 A | 1/1980 | Weisbrod |
| 4,185,895 A | 1/1980 | Stephens et al. |
| 4,186,395 A | 1/1980 | Fujita et al. |
| 4,190,832 A | 2/1980 | Mohler |
| 4,191,955 A | 3/1980 | Robert |
| 4,193,095 A | 3/1980 | Mizushima |
| 4,205,225 A | 5/1980 | LeGoff |
| 4,205,311 A | 5/1980 | Kutaragi |
| 4,212,010 A | 7/1980 | Walter |
| 4,222,106 A | 9/1980 | Hess et al. |
| 4,223,308 A | 9/1980 | Baraff et al. |
| 4,224,617 A | 9/1980 | Stein |
| 4,227,193 A | 10/1980 | Shanks |
| 4,231,035 A | 10/1980 | van Doorn et al. |
| 4,234,245 A | 11/1980 | Toda et al. |
| 4,239,348 A | 12/1980 | Grinberg et al. |
| 4,251,755 A | 2/1981 | Bryden |
| 4,252,417 A | 2/1981 | Scheffer et al. |
| 4,253,096 A | 2/1981 | Kmetz et al. |
| 4,268,827 A | 5/1981 | Hughen et al. |
| 4,272,195 A | 6/1981 | Kaye |
| 4,279,474 A | 7/1981 | Belgorod |
| 4,281,902 A | 8/1981 | Kmetz et al. |
| 4,291,412 A | 9/1981 | Imazeki |
| 4,359,729 A | 11/1982 | Nonomura et al. |
| 4,360,804 A | 11/1982 | Ohura |
| 4,367,924 A | 1/1983 | Clark et al. |
| 4,372,871 A | 2/1983 | Toriyama et al. |
| 4,378,490 A | 3/1983 | D'Auria Luigi |
| 4,378,556 A | 3/1983 | Wisnieff |
| 4,378,557 A | 3/1983 | Murata |
| 4,380,008 A | 4/1983 | Kawakami et al. |
| 4,385,293 A | 5/1983 | Wisnieff |
| 4,385,806 A | 5/1983 | Fergason |
| 4,386,836 A | 6/1983 | Aoki et al. |
| 4,389,093 A | 6/1983 | Jackson |
| 4,394,069 A | 7/1983 | Kaye |
| 4,403,830 A | 9/1983 | Gerstner |
| 4,404,555 A | 9/1983 | Long et al. |
| 4,408,839 A | 10/1983 | Wiener-Avnear |
| 4,410,238 A | 10/1983 | Hanson |
| 4,413,256 A | 11/1983 | Yasuda et al. |
| 4,417,785 A | 11/1983 | Nakamura |
| 4,426,881 A | 1/1984 | Magoulick |
| 4,427,979 A | 1/1984 | Clerc et al. |
| 4,431,989 A | 2/1984 | Grange et al. |
| 4,436,376 A | 3/1984 | Fergason |
| 4,444,469 A | 4/1984 | Kaye |
| 4,458,989 A | 7/1984 | Tschang |
| 4,461,543 A | 7/1984 | McMahon |
| 4,466,702 A | 8/1984 | Wiener-Avnear et al. |
| 4,493,531 A | 1/1985 | Bohmer et al. |
| 4,504,119 A | 3/1985 | Sekimoto et al. |
| 4,504,122 A | 3/1985 | Bartholomew |
| 4,505,548 A | 3/1985 | Berreman et al. |
| 4,508,429 A | 4/1985 | Nagae et al. |
| 4,525,032 A | 6/1985 | Hilsum |
| 4,529,271 A | 7/1985 | Berreman et al. |
| 4,536,760 A | 8/1985 | Navarro et al. |
| 4,538,145 A | 8/1985 | Mitani et al. |
| 4,540,243 A | 9/1985 | Fergason |
| 4,541,691 A | 9/1985 | Buzak |
| 4,548,476 A | 10/1985 | Kaneko |
| 4,551,716 A | 11/1985 | Saito et al. |
| 4,566,758 A | 1/1986 | Bos |
| 4,571,585 A | 2/1986 | Stein et al. |
| 4,575,721 A | 3/1986 | Delgrange et al. |
| 4,581,619 A | 4/1986 | Mizutome et al. |
| 4,581,655 A | 4/1986 | Ide et al. |
| 4,582,396 A | 4/1986 | Bos et al. |
| 4,584,572 A | 4/1986 | Lambert, III |
| 4,586,039 A | 4/1986 | Nonomura et al. |
| 4,591,886 A | 5/1986 | Umeda et al. |
| 4,593,978 A | 6/1986 | Mourey et al. |
| 4,595,259 A | 6/1986 | Perregaux |
| 4,601,542 A | 7/1986 | Meyer |
| 4,601,543 A | 7/1986 | Boyd et al. |
| 4,601,544 A | 7/1986 | Cheng et al. |
| 4,603,973 A | 8/1986 | Crow |
| 4,606,612 A | 8/1986 | Iizuka et al. |
| 4,606,613 A | 8/1986 | Urabe |
| 4,608,558 A | 8/1986 | Amstutz et al. |
| 4,611,897 A | 9/1986 | Hara et al. |
| 4,613,204 A | 9/1986 | Verber et al. |
| 4,626,841 A | 12/1986 | Togashi |
| 4,634,226 A | 1/1987 | Isogai et al. |
| 4,634,229 A | 1/1987 | Amstutz et al. |
| 4,635,051 A | 1/1987 | Bos |

| | | | | | | |
|---|---|---|---|---|---|---|
| 4,635,127 A | 1/1987 | Togashi | | 4,799,051 A | 1/1989 | Tanaka |
| 4,639,091 A | 1/1987 | Huignard et al. | | 4,799,774 A | 1/1989 | Baur et al. |
| 4,642,620 A | 2/1987 | Togashi et al. | | 4,800,382 A | 1/1989 | Okada et al. |
| 4,648,274 A | 3/1987 | Trainer | | 4,802,739 A | 2/1989 | Iwamoto |
| 4,649,517 A | 3/1987 | Kitazima et al. | | 4,804,953 A | 2/1989 | Castleberry |
| 4,651,148 A | 3/1987 | Takeda et al. | | 4,805,973 A | 2/1989 | Watanabe |
| 4,652,087 A | 3/1987 | Bos et al. | | 4,807,974 A | 2/1989 | Hirai |
| 4,653,094 A | 3/1987 | Rasmussen et al. | | 4,807,976 A | 2/1989 | Little et al. |
| 4,654,652 A | 3/1987 | Cerruti | | 4,808,983 A | 2/1989 | Benjamin et al. |
| 4,654,709 A | 3/1987 | Umezawa | | 4,810,059 A | 3/1989 | Kuijk |
| 4,655,552 A | 4/1987 | Togashi et al. | | 4,812,017 A | 3/1989 | Piper |
| 4,655,561 A | 4/1987 | Kanbe et al. | | 4,813,771 A | 3/1989 | Handschy et al. |
| 4,661,809 A | 4/1987 | Anderson et al. | | 4,818,078 A | 4/1989 | Mouri et al. |
| 4,670,744 A | 6/1987 | Buzak | | 4,818,982 A | 4/1989 | Kuehn et al. |
| 4,671,642 A | 6/1987 | Ohkubo et al. | | 4,823,078 A | 4/1989 | Mohebban |
| 4,672,357 A | 6/1987 | Lorteije et al. | | 4,830,467 A | 5/1989 | Inoue et al. |
| 4,675,667 A | 6/1987 | Nakamura et al. | | 4,830,468 A | 5/1989 | Stephany et al. |
| 4,675,699 A | 6/1987 | Kan et al. | | 4,832,456 A | 5/1989 | Yamazaki et al. |
| 4,676,602 A | 6/1987 | Watanabe | | 4,832,462 A | 5/1989 | Clark et al. |
| 4,679,893 A | 7/1987 | Ramer | | 4,834,505 A | 5/1989 | Migliorato et al. |
| 4,682,163 A | 7/1987 | Brooks | | 4,836,654 A | 6/1989 | Fujimura et al. |
| 4,688,899 A | 8/1987 | Fujimura et al. | | 4,838,652 A | 6/1989 | Inaba et al. |
| 4,690,508 A | 9/1987 | Jacob | | 4,838,657 A | 6/1989 | Miura et al. |
| 4,692,779 A | 9/1987 | Ando et al. | | 4,838,662 A | 6/1989 | Hilsum et al. |
| 4,693,563 A | 9/1987 | Harada et al. | | 4,838,663 A | 6/1989 | Lagerwall et al. |
| 4,695,838 A | 9/1987 | Ellis, Jr. | | 4,840,462 A | 6/1989 | Hartmann |
| RE32,521 E | 10/1987 | Fergason | | 4,841,293 A | 6/1989 | Takimoto |
| 4,699,468 A | 10/1987 | Harasim et al. | | 4,841,294 A | 6/1989 | Clerc |
| 4,699,469 A | 10/1987 | Larsen | | 4,844,569 A | 7/1989 | Wada et al. |
| 4,701,026 A | 10/1987 | Yazaki et al. | | 4,848,877 A | 7/1989 | Miller |
| 4,709,995 A | 12/1987 | Kuribayashi et al. | | 4,854,677 A | 8/1989 | O'Meara |
| 4,710,766 A | 12/1987 | Dubois et al. | | 4,856,875 A | 8/1989 | Kozaki et al. |
| 4,712,877 A | 12/1987 | Okada et al. | | 4,859,035 A | 8/1989 | Ichinose et al. |
| 4,712,878 A | 12/1987 | Taniguchi et al. | | 4,859,998 A | 8/1989 | Kawamura et al. |
| 4,714,921 A | 12/1987 | Kanno et al. | | 4,863,245 A | 9/1989 | Roxlo |
| 4,715,688 A | 12/1987 | Harada et al. | | 4,864,290 A | 9/1989 | Waters |
| 4,716,403 A | 12/1987 | Morozumi | | 4,864,390 A | 9/1989 | McKechnie et al. |
| 4,717,243 A | 1/1988 | Boyd et al. | | 4,870,398 A | 9/1989 | Bos |
| 4,723,077 A | 2/1988 | Wu | | 4,878,738 A | 11/1989 | Hanami |
| 4,723,119 A | 2/1988 | Morimoto | | 4,889,414 A | 12/1989 | Rauh et al. |
| 4,725,129 A | 2/1988 | Kondo et al. | | 4,893,904 A | 1/1990 | Ohta et al. |
| 4,726,663 A | 2/1988 | Buzak | | 4,899,140 A | 2/1990 | Ito et al. |
| 4,728,172 A | 3/1988 | Cannella | | 4,901,066 A | 2/1990 | Kobayashi et al. |
| 4,728,947 A | 3/1988 | Ayliffe et al. | | 4,901,140 A | 2/1990 | Lang et al. |
| 4,729,640 A | 3/1988 | Sakata | | 4,904,064 A | 2/1990 | Lagerwall et al. |
| 4,731,871 A | 3/1988 | Ishikawa | | 4,906,073 A | 3/1990 | Hunahata et al. |
| 4,737,781 A | 4/1988 | Robillard | | 4,908,702 A | 3/1990 | Chao et al. |
| 4,737,896 A | 4/1988 | Mochizuki et al. | | 4,909,602 A | 3/1990 | Kaneko et al. |
| 4,738,515 A | 4/1988 | Okada et al. | | 4,909,605 A | 3/1990 | Asano et al. |
| 4,743,096 A | 5/1988 | Wakai et al. | | 4,909,626 A | 3/1990 | Purvis et al. |
| 4,745,404 A | 5/1988 | Kallenberg | | 4,913,532 A | 4/1990 | Yoshida et al. |
| 4,745,485 A | 5/1988 | Iwasaki | | 4,914,730 A | 4/1990 | Fujita |
| 4,746,196 A | 5/1988 | Umeda et al. | | 4,915,477 A | 4/1990 | Ohta et al. |
| 4,752,118 A | 6/1988 | Johnson | | 4,917,452 A | 4/1990 | Liebowitz |
| 4,752,120 A | 6/1988 | Shimizu | | 4,917,470 A | 4/1990 | Okada et al. |
| 4,752,774 A | 6/1988 | Clerc et al. | | 4,919,522 A | 4/1990 | Nelson |
| 4,762,391 A | 8/1988 | Margolin | | 4,923,287 A | 5/1990 | Ooi et al. |
| 4,762,400 A | 8/1988 | Shimoda et al. | | 4,925,277 A | 5/1990 | Inaba |
| 4,763,994 A | 8/1988 | Kaneko et al. | | 4,927,242 A | 5/1990 | Aoki et al. |
| 4,765,720 A | 8/1988 | Toyono et al. | | 4,929,057 A | 5/1990 | Aoki et al. |
| 4,769,659 A | 9/1988 | Umeda et al. | | 4,930,877 A | 6/1990 | Kano et al. |
| 4,769,713 A | 9/1988 | Yasui | | 4,931,787 A | 6/1990 | Shannon |
| 4,770,500 A | 9/1988 | Kalmanash et al. | | 4,932,761 A | 6/1990 | Shingaki et al. |
| 4,770,501 A | 9/1988 | Tamura et al. | | 4,935,671 A | 6/1990 | Harada et al. |
| 4,773,716 A | 9/1988 | Nakanowatari | | 4,935,806 A | 6/1990 | Rabii |
| 4,778,260 A | 10/1988 | Okada et al. | | 4,936,654 A | 6/1990 | Suzaki et al. |
| 4,779,086 A | 10/1988 | Kanno et al. | | 4,937,539 A | 6/1990 | Grinberg et al. |
| 4,783,149 A | 11/1988 | Umeda et al. | | 4,937,670 A | 6/1990 | Whitledge |
| 4,786,898 A | 11/1988 | Hata et al. | | 4,938,565 A | 7/1990 | Ichikawa |
| 4,789,223 A | 12/1988 | Kasahara et al. | | 4,945,352 A | 7/1990 | Ejiri |
| 4,793,693 A | 12/1988 | Shimoda et al. | | 4,946,235 A | 8/1990 | Scozzafava et al. |

| Patent No. | Date | Inventor | Patent No. | Date | Inventor |
|---|---|---|---|---|---|
| 4,948,229 A | 8/1990 | Soref | 5,117,224 A | 5/1992 | Kawamura et al. |
| 4,951,150 A | 8/1990 | Browning | 5,119,084 A | 6/1992 | Kawamura et al. |
| 4,952,029 A | 8/1990 | Hayashi et al. | 5,122,898 A | 6/1992 | Picault |
| 4,952,032 A | 8/1990 | Inoue et al. | 5,124,825 A | 6/1992 | Asano et al. |
| 4,952,034 A | 8/1990 | Azusawa et al. | 5,126,864 A | 6/1992 | Akiyama et al. |
| 4,955,696 A | 9/1990 | Taniguchi et al. | 5,126,868 A | 6/1992 | Kizaki et al. |
| 4,958,912 A | 9/1990 | Inaba et al. | 5,132,826 A | 7/1992 | Johnson et al. |
| 4,958,918 A | 9/1990 | Walker | 5,136,282 A | 8/1992 | Inaba et al. |
| 4,961,633 A | 10/1990 | Ibrahim et al. | 5,144,472 A | 9/1992 | Sang, Jr. et al. |
| 4,962,374 A | 10/1990 | Fujioka et al. | 5,148,300 A | 9/1992 | Mizushima et al. |
| 4,965,591 A | 10/1990 | Kurabayashi et al. | 5,150,241 A | 9/1992 | Joffre et al. |
| 4,973,131 A | 11/1990 | Carnes | 5,151,690 A | 9/1992 | Yamazaki |
| 4,974,940 A | 12/1990 | Asano et al. | 5,157,386 A | 10/1992 | Uchida et al. |
| 4,974,941 A | 12/1990 | Gibbons et al. | 5,157,525 A | 10/1992 | Eaton et al. |
| 4,974,945 A | 12/1990 | Kumada | 5,162,701 A | 11/1992 | Sano et al. |
| 4,975,655 A | 12/1990 | Dawson et al. | 5,162,786 A | 11/1992 | Fukuda |
| 4,979,235 A | 12/1990 | Rumbaugh et al. | 5,164,854 A | 11/1992 | Takanashi et al. |
| 4,982,181 A | 1/1991 | Yianilos | 5,168,270 A | 12/1992 | Masumori et al. |
| 4,984,873 A | 1/1991 | Takiguchi et al. | 5,168,382 A | 12/1992 | Tsujikawa et al. |
| 4,988,167 A | 1/1991 | Fergason | 5,170,158 A | 12/1992 | Shinya |
| 4,991,941 A | 2/1991 | Kalmanash | 5,170,271 A | 12/1992 | Lackner et al. |
| 4,992,779 A | 2/1991 | Sugino et al. | 5,172,107 A | 12/1992 | Kanno et al. |
| 4,992,824 A | 2/1991 | Plummer | 5,172,257 A | 12/1992 | Patel |
| 4,998,725 A | 3/1991 | Watterson et al. | 5,173,687 A | 12/1992 | Tanaka et al. |
| 4,998,805 A | 3/1991 | Agostinelli | 5,181,133 A | 1/1993 | Lipton |
| 4,999,618 A | 3/1991 | Inada et al. | 5,182,664 A | 1/1993 | Clerc |
| 5,004,312 A | 4/1991 | Shimizu | 5,184,118 A | 2/1993 | Yamazaki |
| 5,004,324 A | 4/1991 | Leenhouts et al. | 5,185,602 A | 2/1993 | Bassetti, Jr. et al. |
| 5,005,952 A | 4/1991 | Clark et al. | 5,187,578 A | 2/1993 | Kohgami et al. |
| 5,006,839 A | 4/1991 | Fujita | 5,187,603 A | 2/1993 | Bos |
| 5,010,326 A | 4/1991 | Yamazaki et al. | 5,189,406 A | 2/1993 | Humphries et al. |
| 5,010,328 A | 4/1991 | Morris et al. | 5,189,534 A | 2/1993 | McDonnell et al. |
| 5,013,137 A | 5/1991 | Tsuboyama et al. | 5,189,535 A | 2/1993 | Mochizuki et al. |
| 5,014,048 A | 5/1991 | Knapp | 5,191,454 A | 3/1993 | Iijima et al. |
| 5,016,983 A | 5/1991 | Shioji et al. | 5,196,839 A | 3/1993 | Johary et al. |
| 5,018,076 A | 5/1991 | Johary et al. | 5,202,674 A | 4/1993 | Takemori et al. |
| 5,020,881 A | 6/1991 | Matsuda et al. | 5,208,696 A | 5/1993 | Kobayashi et al. |
| 5,028,865 A | 7/1991 | Meyrueix et al. | 5,220,313 A | 6/1993 | Kumazawa et al. |
| 5,030,005 A | 7/1991 | Swope et al. | 5,220,447 A | 6/1993 | Yokokura et al. |
| 5,032,830 A | 7/1991 | Kuijk | 5,227,900 A | 7/1993 | Inaba et al. |
| 5,032,831 A | 7/1991 | Kuijk | 5,229,860 A | 7/1993 | Kido et al. |
| 5,034,736 A | 7/1991 | Bennett et al. | 5,233,340 A | 8/1993 | Yamaguchi et al. |
| 5,039,208 A | 8/1991 | Ohnishi et al. | 5,237,315 A | 8/1993 | Gay et al. |
| 5,042,916 A | 8/1991 | Ukai et al. | 5,245,438 A | 9/1993 | Yamamoto et al. |
| 5,046,824 A | 9/1991 | Pepper | 5,245,451 A | 9/1993 | Wu et al. |
| 5,047,757 A | 9/1991 | Bone et al. | 5,245,455 A | 9/1993 | Sayyah et al. |
| 5,047,789 A | 9/1991 | Kanayama et al. | 5,247,378 A | 9/1993 | Miller |
| 5,053,889 A | 10/1991 | Nakano et al. | 5,248,965 A | 9/1993 | Yoshimitsu |
| 5,056,896 A | 10/1991 | Iimura et al. | 5,252,817 A | 10/1993 | Fergason et al. |
| 5,058,998 A | 10/1991 | Yoshida et al. | 5,255,110 A | 10/1993 | Mouri et al. |
| 5,061,044 A | 10/1991 | Matsunaga | 5,260,719 A | 11/1993 | Maloney |
| 5,061,049 A | 10/1991 | Hornbeck | 5,264,839 A | 11/1993 | Kanno et al. |
| 5,061,920 A | 10/1991 | Nelson | 5,266,938 A | 11/1993 | Mogi et al. |
| 5,062,001 A | 10/1991 | Farwell et al. | 5,267,065 A | 11/1993 | Taniguchi et al. |
| 5,073,754 A | 12/1991 | Henley | 5,270,852 A | 12/1993 | Tsuchiya et al. |
| 5,074,647 A | 12/1991 | Fergason et al. | 5,274,484 A | 12/1993 | Mochizuki et al. |
| 5,075,798 A | 12/1991 | Sonehara et al. | 5,282,234 A | 1/1994 | Murayama et al. |
| RE33,829 E | 2/1992 | Castleberry | 5,293,159 A | 3/1994 | Bassetti, Jr. et al. |
| 5,087,113 A | 2/1992 | Sakono et al. | 5,294,920 A | 3/1994 | Itabashi |
| 5,087,387 A | 2/1992 | Mullen et al. | 5,296,953 A | 3/1994 | Kanbe et al. |
| 5,089,812 A | 2/1992 | Fuse et al. | 5,303,074 A | 4/1994 | Salisbury |
| 5,090,794 A | 2/1992 | Hatano et al. | 5,311,205 A | 5/1994 | Hamada et al. |
| 5,091,723 A | 2/1992 | Kanno et al. | 5,313,231 A | 5/1994 | Yin et al. |
| 5,093,737 A | 3/1992 | Kanbe et al. | 5,321,811 A | 6/1994 | Kato et al. |
| 5,093,741 A | 3/1992 | Shohara et al. | 5,327,272 A | 7/1994 | Fujiwara et al. |
| 5,103,327 A | 4/1992 | Hirai et al. | 5,327,530 A | 7/1994 | Bae |
| 5,107,353 A | 4/1992 | Okumura | 5,345,250 A | 9/1994 | Inoue et al. |
| 5,109,291 A | 4/1992 | Inaba | 5,347,294 A | 9/1994 | Usui et al. |
| 5,110,562 A | 5/1992 | Sasao et al. | 5,347,378 A | 9/1994 | Handschy et al. |
| 5,111,195 A | 5/1992 | Fukuoka et al. | 5,359,206 A | 10/1994 | Yamamoto et al. |
| 5,111,317 A | 5/1992 | Coulson | 5,379,135 A | 1/1995 | Nakagaki et al. |

| Patent Number | Kind | Date | Inventor |
|---|---|---|---|
| 5,379,138 | A | 1/1995 | Okada |
| 5,381,254 | A | 1/1995 | Kanbe et al. |
| 5,384,650 | A | 1/1995 | TeKolste et al. |
| 5,403,520 | A | 4/1995 | Ashitaka et al. |
| 5,410,423 | A | 4/1995 | Furushima et al. |
| 5,412,397 | A | 5/1995 | Kanatani et al. |
| 5,412,500 | A | 5/1995 | Fergason |
| 5,422,663 | A | 6/1995 | Takanashi et al. |
| 5,424,753 | A | 6/1995 | Kitagawa et al. |
| 5,436,743 | A | 7/1995 | Kanbe et al. |
| 5,436,747 | A | 7/1995 | Suzuki |
| 5,440,412 | A | 8/1995 | Mouri et al. |
| 5,448,383 | A | 9/1995 | Kanbe et al. |
| 5,455,534 | A | 10/1995 | Motegi et al. |
| 5,459,481 | A | 10/1995 | Tanaka et al. |
| 5,465,102 | A | 11/1995 | Usui et al. |
| 5,488,495 | A | 1/1996 | Numao |
| 5,489,919 | A | 2/1996 | Kuwata et al. |
| 5,493,431 | A | 2/1996 | Baba et al. |
| 5,495,265 | A | 2/1996 | Hartman et al. |
| 5,517,207 | A | 5/1996 | Kawada et al. |
| 5,519,523 | A | 5/1996 | Madokoro et al. |
| 5,528,257 | A | 6/1996 | Okumura et al. |
| 5,534,884 | A | 7/1996 | Mase et al. |
| 5,548,303 | A | 8/1996 | Kanbe et al. |
| 5,552,802 | A | 9/1996 | Nonoshita et al. |
| 5,559,616 | A | 9/1996 | Kanbe et al. |
| 5,565,884 | A | 10/1996 | Kanbe et al. |
| 5,568,288 | A | 10/1996 | Yamazaki et al. |
| 5,592,189 | A | 1/1997 | Kuzunuki et al. |
| 5,592,192 | A | 1/1997 | Kanbe et al. |
| 5,602,562 | A | 2/1997 | Onitsuka et al. |
| 5,604,614 | A | 2/1997 | Katagiri et al. |
| 5,606,343 | A | 2/1997 | Tsuboyama et al. |
| 5,608,421 | A | 3/1997 | Okada et al. |
| 5,608,567 | A | 3/1997 | Grupp |
| 5,621,427 | A | 4/1997 | Kanbe et al. |
| 5,629,717 | A | 5/1997 | Netsu |
| 5,633,652 | A | 5/1997 | Kanbe et al. |
| 5,638,196 | A | 6/1997 | Mouri et al. |
| 5,648,330 | A | 7/1997 | Pierschbacher et al. |
| 5,648,662 | A | 7/1997 | Zhang et al. |
| 5,648,793 | A | 7/1997 | Chen |
| 5,691,740 | A | 11/1997 | Onitsuka et al. |
| 5,696,525 | A | 12/1997 | Kanbe et al. |
| 5,696,526 | A | 12/1997 | Kanbe et al. |
| 5,696,570 | A | 12/1997 | Plach et al. |
| 5,703,614 | A | 12/1997 | Mouri et al. |
| 5,724,059 | A | 3/1998 | Kanbe et al. |
| 5,726,679 | A | 3/1998 | Kanno et al. |
| 5,774,102 | A | 6/1998 | Kanbe et al. |
| 5,784,043 | A | 7/1998 | Inoue et al. |
| 5,790,449 | A | 8/1998 | Kanbe et al. |
| 5,812,108 | A | 9/1998 | Kanbe et al. |
| 5,818,412 | A | 10/1998 | Maekawa |
| 5,831,587 | A | 11/1998 | Kanbe et al. |
| 5,841,417 | A | 11/1998 | Kanbe et al. |
| 5,847,686 | A | 12/1998 | Mouri et al. |
| 5,874,974 | A | 2/1999 | Courian et al. |
| RE36,161 | E | 3/1999 | Okubo et al. |
| 5,877,738 | A | 3/1999 | Ito et al. |
| 5,877,739 | A | 3/1999 | Kanbe et al. |
| 5,886,680 | A | 3/1999 | Kanbe et al. |
| 5,896,118 | A | 4/1999 | Netsu |
| 5,929,463 | A | 7/1999 | Stupp et al. |
| 5,952,990 | A | 9/1999 | Inoue et al. |
| 5,959,602 | A | 9/1999 | Welzen |
| 6,067,062 | A | 5/2000 | Takasu et al. |
| 6,067,074 | A | 5/2000 | Lueders |
| 6,091,388 | A | 7/2000 | Kanbe et al. |
| 6,166,798 | A | 12/2000 | Plach et al. |
| 6,177,915 | B1 | 1/2001 | Beeteson et al. |
| 6,262,705 | B1 | 7/2001 | Inoue et al. |
| RE37,333 | E | 8/2001 | Harada et al. |
| 6,297,793 | B1 | 10/2001 | Kawahata |
| 6,452,578 | B1 | 9/2002 | Ito et al. |
| RE38,661 | E | 11/2004 | Tachiuchi et al. |
| 6,969,542 | B2 | 11/2005 | Klasen-Memmer et al. |
| RE40,504 | E | 9/2008 | Imamura |
| 2001/0036002 | A1 | 11/2001 | Tearney et al. |
| 2002/0047823 | A1 | 4/2002 | Yamazaki et al. |
| 2003/0112210 | A1 | 6/2003 | Ito et al. |
| 2005/0052391 | A1 | 3/2005 | Yamazaki et al. |
| 2005/0200581 | A1 | 9/2005 | Mano et al. |
| 2007/0176915 | A1 | 8/2007 | Yamazaki |

FOREIGN PATENT DOCUMENTS

| Country | Number | Date |
|---|---|---|
| DE | 101 12 770 | 12/2001 |
| DE | 101 12 954 | 12/2001 |
| DE | 101 16 400 | 12/2001 |
| DE | 101 22 371 | 12/2001 |
| DE | 101 41 565 | 4/2002 |
| DE | 101 58 081 | 8/2002 |
| EP | 0 005 417 | 11/1979 |
| EP | 0 062 499 | 10/1982 |
| EP | 0 066965 | 12/1982 |
| EP | 0 092 181 | 10/1983 |
| EP | 0 125 841 | 11/1984 |
| EP | 0 138 454 | 4/1985 |
| EP | 0 149 899 | 7/1985 |
| EP | 0 195 584 | 9/1986 |
| EP | 0 201 938 | 11/1986 |
| EP | 0 219 480 | 4/1987 |
| EP | 0 233 636 | 8/1987 |
| EP | 0 238 248 | 9/1987 |
| EP | 0 258996 | 3/1988 |
| EP | 0 261 901 | 3/1988 |
| EP | 0 272 820 | 6/1988 |
| EP | 0 311 979 | 4/1989 |
| EP | 0 319 291 | 8/1989 |
| EP | 0 368 117 | 10/1989 |
| EP | 0 356 730 | 3/1990 |
| EP | 0 359 280 | 3/1990 |
| EP | 0 376 278 | 7/1990 |
| EP | 0 173 246 | 8/1990 |
| EP | 0 390 511 | 10/1990 |
| EP | 0 393 967 | 10/1990 |
| EP | 0 416 172 | 3/1991 |
| EP | 0 422 687 | 4/1991 |
| EP | 0 425 210 | 5/1991 |
| EP | 0 425 321 | 5/1991 |
| EP | 0 429 891 | 6/1991 |
| EP | 0 463 723 | 1/1992 |
| EP | 0 507 242 | 10/1992 |
| EP | 0 373 786 | 2/1995 |
| EP | 0 978 752 | 2/2000 |
| EP | 1 091 236 | 4/2001 |
| EP | 1 172 685 | 1/2002 |
| EP | 1 201 727 | 5/2002 |
| EP | 1 365 278 | 11/2003 |
| FR | 2 152 757 | 4/1973 |
| FR | 2 262 844 | 9/1975 |
| FR | 2 532 453 | 3/1984 |
| FR | 2 534 690 | 4/1984 |
| FR | 2 534 716 | 4/1984 |
| FR | 2 541 784 | 8/1984 |
| GB | 1 512 702 | 6/1978 |
| GB | 2 011 641 | 7/1979 |
| GB | 2 037 048 | 7/1980 |
| GB | 2 105 864 | 3/1983 |
| GB | 2 117 157 | 10/1983 |
| GB | 2 129 151 | 5/1984 |

| | | | | | |
|---|---|---|---|---|---|
| GB | 2 161 808 | 1/1986 | JP | 61-160726 | 7/1986 |
| GB | 2 172 408 | 9/1986 | JP | 61-170188 | 7/1986 |
| GB | 1 175 171 | 11/1986 | JP | 61-172122 | 8/1986 |
| GB | 2 184 860 | 7/1987 | JP | 61-200593 | 9/1986 |
| GB | 2 196 751 | 5/1988 | JP | 61-230121 | 10/1986 |
| GB | 2 202 643 | 9/1988 | JP | 61-243429 | 10/1986 |
| GB | 2 196 751 | 9/1990 | JP | 61-243430 | 10/1986 |
| GB | 2 255 193 | 10/1992 | JP | 61-246718 | 11/1986 |
| JP | 51-28796 | 3/1976 | JP | 61-254932 | 11/1986 |
| JP | 51-65960 | 6/1976 | JP | 61-260226 | 11/1986 |
| JP | 52-070794 | 6/1977 | JP | 61-267738 | 11/1986 |
| JP | 52-099718 | 8/1977 | JP | 62-009321 | 1/1987 |
| JP | 52-115197 | 9/1977 | JP | 62-009322 | 1/1987 |
| JP | 52-143048 | 11/1977 | JP | 62-043625 | 2/1987 |
| JP | 53-054498 | 5/1978 | JP | 62-050733 | 3/1987 |
| JP | 54-051500 | 4/1979 | JP | 62-075516 | 4/1987 |
| JP | 54-070797 | 6/1979 | JP | 62-079426 | 4/1987 |
| JP | 54-155796 | 12/1979 | JP | 62-079427 | 4/1987 |
| JP | 55-109076 | 8/1980 | JP | 62-081626 | 4/1987 |
| JP | 56-064319 | 6/1981 | JP | 62-083726 | 4/1987 |
| JP | 56-085733 | 7/1981 | JP | 62-085226 | 4/1987 |
| JP | 56-093568 | 7/1981 | JP | 62-092920 | 4/1987 |
| JP | 57-019715 | 2/1982 | JP | 62-092921 | 4/1987 |
| JP | 57-120463 | 7/1982 | JP | 62-123428 | 6/1987 |
| JP | 57-120465 | 7/1982 | JP | 62-138838 | 6/1987 |
| JP | 57-185412 | 11/1982 | JP | 62-150333 | 7/1987 |
| JP | 58-007613 | 1/1983 | JP | 62-150334 | 7/1987 |
| JP | 58-014822 | 1/1983 | JP | 62-175712 | 8/1987 |
| JP | 58-017422 | 2/1983 | JP | 62-218942 | 9/1987 |
| JP | 58-017423 | 2/1983 | JP | 62-226133 | 10/1987 |
| JP | 58-017424 | 2/1983 | JP | 62-230172 | 10/1987 |
| JP | 58-017425 | 2/1983 | JP | 62-238525 | 10/1987 |
| JP | 58-023016 | 2/1983 | JP | 62-254126 | 11/1987 |
| JP | 58-042030 | 3/1983 | JP | 62-256580 | 11/1987 |
| JP | 58-049913 | 3/1983 | JP | 62-265629 | 11/1987 |
| JP | 58-050515 | 3/1983 | JP | 62-266520 | 11/1987 |
| JP | 58-065418 | 4/1983 | JP | 62-287225 | 12/1987 |
| JP | 58-176623 | 10/1983 | JP | 62-287226 | 12/1987 |
| JP | 58-182620 | 10/1983 | JP | 63-056628 | 3/1988 |
| JP | 58-198026 | 11/1983 | JP | 63-061230 | 3/1988 |
| JP | 58-221826 | 12/1983 | JP | 63-061231 | 3/1988 |
| JP | 59-029226 | 2/1984 | JP | 63-061232 | 3/1988 |
| JP | 59-037522 | 3/1984 | JP | 63-066541 | 3/1988 |
| JP | 59-048735 | 3/1984 | JP | 63-071832 | 4/1988 |
| JP | 59-125182 | 7/1984 | JP | 63-074095 | 4/1988 |
| JP | 59-137925 | 8/1984 | JP | 63-085721 | 4/1988 |
| JP | 59-147326 | 8/1984 | JP | 63-103211 | 5/1988 |
| JP | 59-195225 | 11/1984 | JP | 63-103212 | 5/1988 |
| JP | 59-208993 | 11/1984 | JP | 63-143530 | 6/1988 |
| JP | 60-015624 | 1/1985 | JP | 63-151997 | 6/1988 |
| JP | 60-033535 | 2/1985 | JP | 63-170615 | 7/1988 |
| JP | 60-072981 | 4/1985 | JP | 63-192021 | 8/1988 |
| JP | 60-078422 | 5/1985 | JP | 63-201629 | 8/1988 |
| JP | 60-165625 | 8/1985 | JP | 63-212920 | 9/1988 |
| JP | 60-195521 | 10/1985 | JP | 63-236012 | 9/1988 |
| JP | 60-230121 | 11/1985 | JP | 63-243919 | 10/1988 |
| JP | 61-017129 | 1/1986 | JP | 63-247729 | 10/1988 |
| JP | 61-020017 | 1/1986 | JP | 63-262622 | 10/1988 |
| JP | 61-034523 | 2/1986 | JP | 63-262623 | 10/1988 |
| JP | 61-051129 | 3/1986 | JP | 63-274565 | 11/1988 |
| JP | 61-067835 | 4/1986 | JP | 63-278032 | 11/1988 |
| JP | 61-067836 | 4/1986 | JP | 63-278033 | 11/1988 |
| JP | 61-069283 | 4/1986 | JP | 63-278034 | 11/1988 |
| JP | 61-069284 | 4/1986 | JP | 63-281135 | 11/1988 |
| JP | 61-073927 | 4/1986 | JP | 63-301926 | 12/1988 |
| JP | 61-093432 | 5/1986 | JP | 63-306426 | 12/1988 |
| JP | 61-098389 | 5/1986 | JP | 63-309929 | 12/1988 |
| JP | 61-100731 | 5/1986 | JP | 63-316026 | 12/1988 |
| JP | 61-112131 | 5/1986 | JP | 63-316028 | 12/1988 |
| JP | 61-140924 | 6/1986 | JP | 01-010299 | 1/1989 |
| JP | 61-148428 | 7/1986 | JP | 64-10299 | 1/1989 |

| | | | | | |
|---|---|---|---|---|---|
| JP | 64-009498 | 1/1989 | JP | 2-210493 | 8/1990 |
| JP | 64-010299 | 1/1989 | JP | 2-210985 | 8/1990 |
| JP | 64-018194 | 1/1989 | JP | 2-211497 | 8/1990 |
| JP | 64-020595 | 1/1989 | JP | 2-212886 | 8/1990 |
| JP | 64-040991 | 2/1989 | JP | 2-212888 | 8/1990 |
| JP | 64-042636 | 2/1989 | JP | 2-217893 | 8/1990 |
| JP | 64-046731 | 2/1989 | JP | 2-225149 | 9/1990 |
| JP | 64-73320 | 3/1989 | JP | 2-235092 | 9/1990 |
| JP | 64-059316 | 3/1989 | JP | 2-253293 | 10/1990 |
| JP | 64-068732 | 3/1989 | JP | 2-262122 | 10/1990 |
| JP | 64-072869 | 3/1989 | JP | 2-265985 | 10/1990 |
| JP | 64-078233 | 3/1989 | JP | 2-266772 | 10/1990 |
| JP | 64-081995 | 3/1989 | JP | 2-272421 | 11/1990 |
| JP | 64-082097 | 3/1989 | JP | 2-273720 | 11/1990 |
| JP | 64-084298 | 3/1989 | JP | 2-282728 | 11/1990 |
| JP | 64-086197 | 3/1989 | JP | 2-282788 | 11/1990 |
| JP | 1-113792 | 5/1989 | JP | 2-289827 | 11/1990 |
| JP | 1-113794 | 5/1989 | JP | 2-310517 | 12/1990 |
| JP | 1-118197 | 5/1989 | JP | 2-310518 | 12/1990 |
| JP | 1-136483 | 5/1989 | JP | 2-312467 | 12/1990 |
| JP | 1-154127 | 6/1989 | JP | 3-002722 | 1/1991 |
| JP | 1-154128 | 6/1989 | JP | 3-006521 | 1/1991 |
| JP | 1-161319 | 6/1989 | JP | 3-006522 | 1/1991 |
| JP | 1-161320 | 6/1989 | JP | 3-018892 | 1/1991 |
| JP | 1-178930 | 7/1989 | JP | 3-020714 | 1/1991 |
| JP | 1-179994 | 7/1989 | JP | 3-035217 | 2/1991 |
| JP | 1-195783 | 8/1989 | JP | 3-063692 | 3/1991 |
| JP | 1-201625 | 8/1989 | JP | 3-077993 | 4/1991 |
| JP | 1-201697 | 8/1989 | JP | 3-096182 | 4/1991 |
| JP | 1-217396 | 8/1989 | JP | 3-096993 | 4/1991 |
| JP | 1-217499 | 8/1989 | JP | 3-098085 | 4/1991 |
| JP | 1-231493 | 9/1989 | JP | 3-102320 | 4/1991 |
| JP | 1-234896 | 9/1989 | JP | 3-105310 | 5/1991 |
| JP | 1-255828 | 10/1989 | JP | 3-107920 | 5/1991 |
| JP | 1-270030 | 10/1989 | JP | 3-122615 | 5/1991 |
| JP | 1-300328 | 12/1989 | JP | 3-126069 | 5/1991 |
| JP | 2-001893 | 1/1990 | JP | 3-126070 | 5/1991 |
| JP | 2-008813 | 1/1990 | JP | 3-126071 | 5/1991 |
| JP | 2-010313 | 1/1990 | JP | 3-154029 | 7/1991 |
| JP | 2-023315 | 1/1990 | JP | 3-158895 | 7/1991 |
| JP | 2-029619 | 1/1990 | JP | 3-172822 | 7/1991 |
| JP | 2-029620 | 1/1990 | JP | 3-174186 | 7/1991 |
| JP | 2-063278 | 3/1990 | JP | 3-175887 | 7/1991 |
| JP | 2-074925 | 3/1990 | JP | 3-192390 | 8/1991 |
| JP | 2-079020 | 3/1990 | JP | 3-203717 | 9/1991 |
| JP | 2-079091 | 3/1990 | JP | 3-203718 | 9/1991 |
| JP | 2-079817 | 3/1990 | JP | 3-208015 | 9/1991 |
| JP | 2-108380 | 4/1990 | JP | 3-209215 | 9/1991 |
| JP | 2-113294 | 4/1990 | JP | 3-219288 | 9/1991 |
| JP | 2-113447 | 4/1990 | JP | 3-226717 | 10/1991 |
| JP | 2-113476 | 4/1990 | JP | 3-227125 | 10/1991 |
| JP | 2-118522 | 5/1990 | JP | 3-235916 | 10/1991 |
| JP | 2-120722 | 5/1990 | JP | 3-242624 | 10/1991 |
| JP | 2-125225 | 5/1990 | JP | 3-243915 | 10/1991 |
| JP | 2-125227 | 5/1990 | JP | 3-329287 | 10/1991 |
| JP | 2-132419 | 5/1990 | JP | 3-246593 | 11/1991 |
| JP | 2-137586 | 5/1990 | JP | 3-246594 | 11/1991 |
| JP | 2-145683 | 6/1990 | JP | 3-251818 | 11/1991 |
| JP | 2-153687 | 6/1990 | JP | 3-256096 | 11/1991 |
| JP | 2-153688 | 6/1990 | JP | 3-274527 | 12/1991 |
| JP | 2-154229 | 6/1990 | JP | 3-282420 | 12/1991 |
| JP | 2-157794 | 6/1990 | JP | 3-284092 | 12/1991 |
| JP | 2-157895 | 6/1990 | JP | 3-294823 | 12/1991 |
| JP | 2-160285 | 6/1990 | JP | 4-001611 | 1/1992 |
| JP | 2-162321 | 6/1990 | JP | 4-014093 | 1/1992 |
| JP | 2-162322 | 6/1990 | JP | 4-018595 | 1/1992 |
| JP | 2-168229 | 6/1990 | JP | 4-034492 | 2/1992 |
| JP | 2-178622 | 7/1990 | JP | 4-035377 | 2/1992 |
| JP | 2-179608 | 7/1990 | JP | 4-037894 | 2/1992 |
| JP | 2-193116 | 7/1990 | JP | 4-042211 | 2/1992 |
| JP | 2-195322 | 8/1990 | JP | 4-043777 | 2/1992 |

| JP | 4-051187 | 2/1992 |
| JP | 4-052621 | 2/1992 |
| JP | 4-055814 | 2/1992 |
| JP | 4-062516 | 2/1992 |
| JP | 4-069619 | 3/1992 |
| JP | 4-081815 | 3/1992 |
| JP | 4-088314 | 3/1992 |
| JP | 4-090509 | 3/1992 |
| JP | 4-095995 | 3/1992 |
| JP | 4-097219 | 3/1992 |
| JP | 4-097285 | 3/1992 |
| JP | 4-104675 | 4/1992 |
| JP | 4-110886 | 4/1992 |
| JP | 4-115290 | 4/1992 |
| JP | 4-116688 | 4/1992 |
| JP | 4-121714 | 4/1992 |
| JP | 4-288589 | 10/1992 |
| JP | 4-365094 | 12/1992 |
| JP | 5-061073 | 3/1993 |
| JP | 5-189183 | 7/1993 |
| JP | 5-203946 | 8/1993 |
| JP | 6-035421 | 2/1994 |
| JP | 61-009618 | 1/1996 |
| JP | 9-096819 | 4/1997 |
| JP | 9-185032 | 7/1997 |
| JP | 2000-147576 | 5/2000 |
| JP | 2000-171790 | 6/2000 |
| JP | 2000-275615 | 10/2000 |
| JP | 2000-275616 | 10/2000 |
| JP | 2000-275617 | 10/2000 |
| JP | 2000-321588 | 11/2000 |
| JP | 2001-083479 | 3/2001 |
| JP | 2001-083552 | 3/2001 |
| JP | 2001-281665 | 10/2001 |
| JP | 2001-290121 | 10/2001 |
| JP | 2001-290173 | 10/2001 |
| JP | 2001-296527 | 10/2001 |
| JP | 2001-305547 | 10/2001 |
| JP | 2001-305548 | 10/2001 |
| JP | 2001-330862 | 11/2001 |
| JP | 2002-090746 | 3/2002 |
| JP | 2002-090747 | 3/2002 |
| JP | 2003-090991 | 3/2003 |
| JP | 2005-070320 | 3/2005 |
| JP | 2005-352350 | 12/2005 |
| JP | 2007-003904 | 1/2007 |
| JP | 2007-094442 | 4/2007 |
| JP | 2007-256390 | 10/2007 |
| JP | 2007-323096 | 12/2007 |
| JP | 2007-334372 | 12/2007 |
| WO | WO 84/01037 | 3/1984 |
| WO | WO 87/01468 | 3/1987 |
| WO | WO 00/55882 | 9/2000 |
| WO | WO 00/74384 | 12/2000 |
| WO | WO 01/10137 | 2/2001 |
| WO | WO 02/12415 | 2/2002 |
| WO | WO 02/46330 | 6/2002 |
| WO | WO 02/079871 | 10/2002 |
| WO | WO 02/103666 | 12/2002 |
| WO | WO 03/009055 | 1/2003 |
| WO | WO 03/063126 | 7/2003 |
| WO | WO 2004/033406 | 4/2004 |
| WO | WO 2006/122679 | 11/2006 |

OTHER PUBLICATIONS

Wu, "Nematic liquid crystal modulator with response time less than 100 μs at room temperature", Appl. Phys. Lett. 57 (10), Sep. 3, 1990, pp. 986–988.

Okumura et al., "A new low–image–lag drive method for large–size LCTV's", Journal of the SID, 1/3, 1993, pp. 335–339.

Soref et al., "Electronically Controlled Birefringenca of Thin Nematic Films", Journal of Applied Physics, vol. 43, No. 5, May 1972, pp. 2029–2037.

Wu et al., "High–speed liquid–crystal modulators using transient nematic effect", Journal of Applied Physics, vol. 65, No. 2, Jan. 15, 1989, pp. 527–532.

La Bras et al., "LC cell's response time improvement for polarization control application", SPIE vol. 1665 Liquid Crystal Materials, Devices, and Applications, 1992, pp. 323–330.

Kaneko, "Liquid Crystal TV Displays: Principles and Applications of Liquid Crystal Displays", Advances in Optoelectronics (ADOP), 1987.

Armitage, "Liquid crystal voltage controlled retardation display", Applied Optics, vol. 19, No. 13, Jul. 1, 1980, pp. 2235–2239.

Okamura, "Low–Voltage Driving in Nematic Liquid Crystal Overlayed Waveguide", Journal of Lightwave Technology, vol. LT–4, No. 3, Mar. 1986, pp. 360–363.

Horikiri et al., "Microcomputer–Controlled Liquid Crystal Display for Automobiles", IEEE Transactions on Industrial Electronics, vol. IE–30, No. 2, May 1983, pp. 138–142.

Chosakai, New Liquid Crystal Technologies, Physical Properties, Materials, Applications.

Document No. Sharp00000599; pp. 160–161, 240–241.

Yariv & Yeh, "Optical Waves in Crystals; Propagation and Control of Laser Radiation", pp. 128–131.

Rumbaugh et al., "Polarization Control for Coherent Fiber–Optic Systems Using Nematic Liquid Crystals", Journal of Lightwave Technology, vol. 8, No. 3, Mar. 1990, pp. 459–465.

Wu et al., "Small angle relaxation of highly deformed nematic liquid crystals", App. Phys. Lett., vol. 53, No. 19, Nov. 7, 1988, pp. 1794–1796.

Kahn et al., Surface–Produced Alignment of Liquid Crystals, Proceedings of the IEEE, vol. 61, No. 7, Jul. 1973, pp. 823–828.

Schadt et al., "Voltage–Dependent Optical Activity of a Twisted Nematic Liquid Crystal", Applied Physics Letters, vol. 16, No. 4, Feb. 15, 1971, pp. 127–128.

Nagata et al., "14.5: Capacitively Coupled Driving of TFT–LCD", SID 89 Digest, pp. 242–245.

Okumura et al., "32.3: A New Low–Image–Lag Drive Method for Large–Size LCTVs", SID 92 Digest, pp. 601–604.

Uehara et al., "Reduction of Electrooptical Response Times of a Field–Effect Liquid–Crystal Device: Application to Dynamic–Driven Real–Time Matrix Display", IEEE Transactions on Electron Device, Sep. 1975, pp. 804–805.

Boyd et al., "Organic Materials Requirements and Design Criteria for an Electro–Optic Phase Shifter", SPIE vol. 971 Nonlinear Optical Properties of Organic Materials, 1988, pp. 230–237.

Noé et al., "Comparison of Polarization Handling Methods in Coherent Optical Systems", Lightwave Technology, vol. 9, No. 10, Oct. 1991, pp. 1353–1366.

Efron et al., "The silicon liquid–crystal light wave", Journal of Applied Physics, vol. 57, No. 4, Feb. 15, 1985, pp. 1356–1368.

Kaneko, "Basic Concept of Liquid Crystal Cells", Liquid Crystals TV Displays: Principles and Applications of Liquid Crystal Displays, Advances in Optoelectronics (ADOP), 1987, pp. 15–25.

Okumura et al., "27.6: A New Flicker–Reduction Drive Method for High–Resolution LCTVs", SID 91 Digest, pp. 551–554.

Selected Papers on Liquid Crystals for Optics, Table of Contents.

Okoshi, "Polarization–State Control Schemes for Heterodyne or Homodyne Optical Fiber Communictions", Journal of Lightwave Technology, vol. LT–3, No. 6, Dec. 1985, pp. 1232–1238.

Noé, "Endless polarization control for heterodyne/homodyne receivers", SPIE vol. 630 Fibre Optics, 1986, pp. 150–155.

Proceedings of the Oregon Academy of Science, vol. 24, 1988, pp. 72–73.

Displaytech, Inc., LV050AC Light Valve Data Sheet.

Displaytech, Inc., DR50 FLC Driver Preliminary Data Sheet, Apr. 1991.

Chandrasekhar, "5.10 Ferroelectric liquid crystals", Liquid Crystals, Second Edition, 1992, pp. 378–387.

Gennes et al., "1.4.2 Smectics C", The Physics of Liquid Crystals, Second Edition, 1993, pp. 20–22.

"Electro–Optic Liquid Crystals", BDH Advanced Materials Division.

Liquid Crystals; Advanced Materials Division, Datasheet 15.

Liquid Crystals; Advanced Materials Division, Datasheet 3.

Wagner et al., "Electrically controlled optical switch for multimode fiber applications", Applied Optics, vol. 19, No. 17, Sep. 1980, pp. 2921–2925.

Shankar et al., "A 2×2 Fiber Optic Switch Using Chiral Liquid Crystals", IEEE Photonics Technology Letters, vol. 2, No. 2, Feb. 1990, pp. 147–149.

Mao et al., "Photovoltaic Optically Addressed Spatial Light Modulator", Ferroelectrics, vol. 122, 1992, pp. 101–112.

Bos et al., "The pi–Cell: A Fast Liquid–Crystal Optical–Switching Device", Mol. Cryst. Liq. Cryst., vol. 113, 1981, pp. 329–339.

Jacobs, "Liquid crystals as large aperture waveplates and circular polarizers", SPIE vol. 307 Polarizers and Applications, 1981, pp. 98–105.

Skarp, "Ferroelectric Liquid Crystals. Material Properties and Applications", Mol. Cryst. Liq. Cryst., vol. 165, 1998, pp. 439–509.

Meadowlark Optics, U.S. Price List, Jan. 1, 1991.

Adachi et al., "17A.5: A High–Resolution TFT–LCD for a High–Definition Projections TV", SID 90 Digest, 1990, pp. 338–341.

Aftergut et al., "6.6: Technique for Reducing Decay Time in Twisted Nematic Cells", SID 77 Digest, pp. 68–69.

Robinson et al., "Polarization–independent broadband, bistable, 2×2 optical exchange switch", Optics Letters, vol. 15, No. 2, Jan. 15, 1990, pp. 145–147.

Saleh et al., "Fundamentals of Photonics", 1991, pp. 193–203, 721–727.

Hecht et al., Optics Second Edition, 1987, pp. 300–304.

Lu et al., "Theory and design of the liquid crystal TV as an optical spatial phase modulator", Optical Engineering, vol. 29, No. 3, Mar. 1990, pp. 240–246.

US 5,347,382 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 2, 3, 4, 5, 6, 10, 11 and 20 is confirmed.

New claims 22-29 are added and determined to be patentable.

Claims 7-9, 12-19 and 21 were not reexamined.

22. An optical retarder system comprising:
a retarder including two transparent plates disposed substantially parallel to one another, respective surfaces of said plates facing one another and each having respective transparent electrodes disposed thereon, liquid crystal material disposed between said electrodes, and an alignment layer aligning said liquid crystal material in a predetermined manner, the retarder controlling retardance of light passing therethrough along a first eigen-axis thereof relative to a second eigen-axis thereof in response to an application of a signal; and
a driver including a controller, the driver being connected to the retarder and supplying the signal having an ac voltage of selected amplitude to the transparent electrodes,
wherein the contoller changes the retardance from a first retardance to a second retardance by causing the signal to change, in a direction toward the second retardance, from a first amplitude which is required for the first retardance to a second amplitude, beyond a third amplitude which is required for the second retardance, for a period of time, and then causing the signal to change to the third amplitude required for the second retardance;
wherein an index of refraction along one of the first eigen-axis and the second eigen-axis is varied by the signal applied to the retarder.

23. An optical retarder system comprising:
a retarder including two transparent plates disposed substantially parallel to one another, respective surfaces of said plates facing one another and each having respective transparent electrodes disposed thereon, liquid crystal material disposed between said electrodes, and an alignment layer aligning said liquid crystal material in a predetermined manner, the retarder controlling retardance of light passing therethrough along a first eigen-axis thereof relative to a second eigen-axis thereof in response to an application of a signal; and
a driver including a controller, the driver being connected to the retarder and supplying the signal having an ac voltage of selected amplitude to the transparent electrodes,
wherein the controller changes the retardance from a first retardance to a second retardance by causing the signal to change, in a direction toward the second retardance, from a first amplitude which is required for the first retardance to a second amplitude, beyond a third amplitude which is required for the second retardance, for a period of time, and then causing the signal to change to the third amplitude required for the second retardance;
wherein incoming linearly polarized light is incident on the optical retarder at about 45 degrees with respect to the first eigen-axis and the second eigen-axis.

24. A method for controlling an optical retarder for controlling the retardance of light passing therethrough along a first eigen-axis thereof relative to a second eigen-axis thereof in response to the application of signal thereto, said method comprising;
(a) supplying a signal to said retarder to control its retardance;
(b) changing said retardance from a first retardance to a second retardance by causing said signal to change, in a direction to move toward said second retardance, from a first amplitude which is required for said first retardance to a second amplitude, beyond a third which is required for said second retardance, for a period of time; and
(c) thereafter causing said signal to change to said third amplitude required for said second retardance,
wherein an index of refraction along one of the first eigen-axis and the second eigen-axis is varied by the signal applied to the retarder.

25. A method for controlling an optical retarder for controlling the retardance of light passing therethrough along a first eigen-axis thereof relative to a second eigen-axis thereof in response to the application of signal thereto, said method comprising:
(a) supplying a signal to said retarder to control its retardance;
(b) changing said retardance from a first retardance to a second retardance by causing said signal to change, in a direction to move toward said second retardance, from a first amplitude which is required for said first retardance to a second amplitude, beyond a third which is required for said second retardance, for a period of time; and
(c) thereafter causing said signal to change to said third amplitude required for said second retardance,
wherein incoming linearly polarized light is incident on the optical retarder at about 45 degrees with respect to the first eigen-axis and the second eigen-axis.

26. An optical retarder system, comprising:
a retarder having a first eigen-axis and a second eigen-axis, the retarder controlling a retardance of light passing therethrough along the first eigen-axis thereof relative to the second eigen axis thereof in response to a signal;
a driver including a controller, the driver being connected to the retarder and supplying the signal applied to the retarder, wherein the controller changes the retardance from a first retardance to a second retardance by causing the signal to change, in a direction toward the second retardance, from a first amplitude which is required for the first retardance to a second amplitude, beyond a third amplitude which is required for the second retardance, for a period of time, and then causing the signal to change to the third amplitude required for the second retardance;

wherein an index of refraction along one of the first eigen-axis and the second eigen-axis is varied by the signal applied to the retarder.

27. An optical retarder system, comprising:

a retarder having a first eigen-axis and a second eigen-axis, the retarder controlling a retardance of light passing therethrough along the first eigen-axis thereof relative to the second eigen-axis thereof in response to a signal;

a driver including a controller, the driver being connected to the retarder and supplying the signal applied to the retarder, wherein the controller changes the retardance from a first retardance to a second retardance by causing the signal to change, in a direction toward the second retardance, from a first amplitude which is required for the first retardance to a second amplitude, beyond a third amplitude which is required for the second retardance, for a period of time, and then causing the signal to change to the third amplitude required for the second retardance;

wherein incoming linearly polarized light is incident on the retarder at about 45 degrees with respect to the first eigen-axis and the second eigen-axis.

28. An optical retarder system comprising:

a retarder including two transparent plates disposed substantially parallel to one another, respective surfaces of said plates facing one another and each having respective transparent electrodes disposed thereon, liquid crystal material disposed between said electrodes, and an alignment layer aligning said liquid crystal material in a predetermined manner, the retarder controlling retardance of light passing therethrough along a first eigen-axis thereof relative to a second eigen-axis thereof in response to the application of a signal; and a driver including a controller, the driver being connected to the retarder and supplying the signal having an ac voltage of selected amplitude to the transparent electrodes, wherein the controller changes the retardance from a first retardance to a second retardance by causing the signal to change, in a direction toward the second retardance, from a first amplitude which is required for the first retardance to a second amplitude, beyond a third amplitude which is required for the second retardance, for a period of time, and then causing the signal to change to the third amplitude required for the second retardance.

29. A method for controlling an optical retarder for controlling the retardance of light passing therethrough along a first eigen-axis thereof relative to a second eigen-axis thereof in response to the application of signal thereto, said method comprising:

(a) supplying a signal to said retarder to control its retardance;

(b) changing the retardance from a first retardance to a second retardance by causing said signal to change, in a direction to move toward said second retardance, from a first amplitude which is required for said first retardance to a second amplitude, beyond a third which is required for said second retardance, for a period of time; and (c) thereafter causing said signal to change to said third amplitude required for said second retardance, wherein said third amplitude is lower than said first amplitude and said second amplitude is lower than said third amplitude.

* * * * *